United States Patent

Yamada et al.

Patent Number: 6,122,075
Date of Patent: Sep. 19, 2000

[54] IMAGE FORMING APPARATUS

[75] Inventors: Kunio Yamada; Atsushi Ogihara, both of Nakai-Machi, Japan

[73] Assignee: Fuji Xerox Co., Ltd., Tokyo, Japan

[21] Appl. No.: 08/951,163

[22] Filed: Oct. 15, 1997

[30] Foreign Application Priority Data

Oct. 28, 1996 [JP] Japan ................................. 8-285007

[51] Int. Cl.⁷ .................................................. H04N 1/40
[52] U.S. Cl. .......................... 358/446; 358/406; 358/468; 358/504; 399/38; 399/72
[58] Field of Search .................................. 358/406, 401, 358/446, 501, 504, 468; 399/38, 46, 72

[56] References Cited

U.S. PATENT DOCUMENTS

| 4,183,657 | 1/1980 | Ernst et al. ............................... 399/72 |
| 5,721,623 | 2/1998 | Boxma ..................................... 358/406 |
| 5,999,761 | 12/1999 | Binder et al. ............................. 399/72 |

FOREIGN PATENT DOCUMENTS

| 62-296669 | 12/1987 | Japan . |
| 63-177176 | 7/1988 | Japan . |
| 63-177177 | 7/1988 | Japan . |
| 63-177178 | 7/1988 | Japan . |
| 63-185279 | 7/1988 | Japan . |
| 4-558868 | 2/1992 | Japan . |
| 7-168412 | 7/1995 | Japan . |

*Primary Examiner*—Thomas D. Lee
*Attorney, Agent, or Firm*—Oliff & Berridge, PLC

[57] ABSTRACT

According to this invention, a controlled image quality is obtained without adjustment with respect to a short range of environmental changes in temperature, humidity and the like, and feedback control is easily performed for controlled variables over a long range to cope with changes with time, and the like. In the two-component non-contact development, the image density becomes stable irrespective of any environmental changes in temperature, humidity and the like when the developing bias AC voltage in the developer unit is a predetermined value. At the same developing bias AC voltage, when the rotating speed of the development roll is changed, the image density varies While making the developing bias AC voltage and the development roller rotating speed variable at the same time, a reference pattern is prepared on a banner sheet to measure the image density with an optical sensor. From the measured results, the stable value for the developing bias AC voltage is determined, and further the rotating speed of the development roller at which desired image quality density is attained, is determined.

11 Claims, 23 Drawing Sheets

| NO. | 1 | 2 | 3 | 4 | 5 | 6 | 7 | 8 | 9 | 10 |
|---|---|---|---|---|---|---|---|---|---|---|
| VBpp | 50 | 60 | 70 | 80 | 90 | 100 | 110 | 120 | 130 | 140 |
| DR | 105 | 125 | 105 | 125 | 105 | 125 | 105 | 125 | 105 | 125 |

Fig. 16

| NO. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| DC | 50 | 60 | 70 | 80 | 90 | 100 | 110 | 120 | 130 | 140 | 150 | 160 | 170 | 180 | 190 | 200 |
| DR | 105 | 125 | 105 | 125 | 105 | 125 | 105 | 125 | 105 | 125 | 105 | 125 | 105 | 125 | 105 | 125 |

PARAMETER A
(DC SET VALUE)

PARAMETER B
(DR SET VALUE)

BANNER SHEET

OPTICAL SENSOR
MEASURED VALUE

RATE OF CHANGE
IN OPTICAL SENSOR
MEASURED VALUE
TO DC SET VALUE

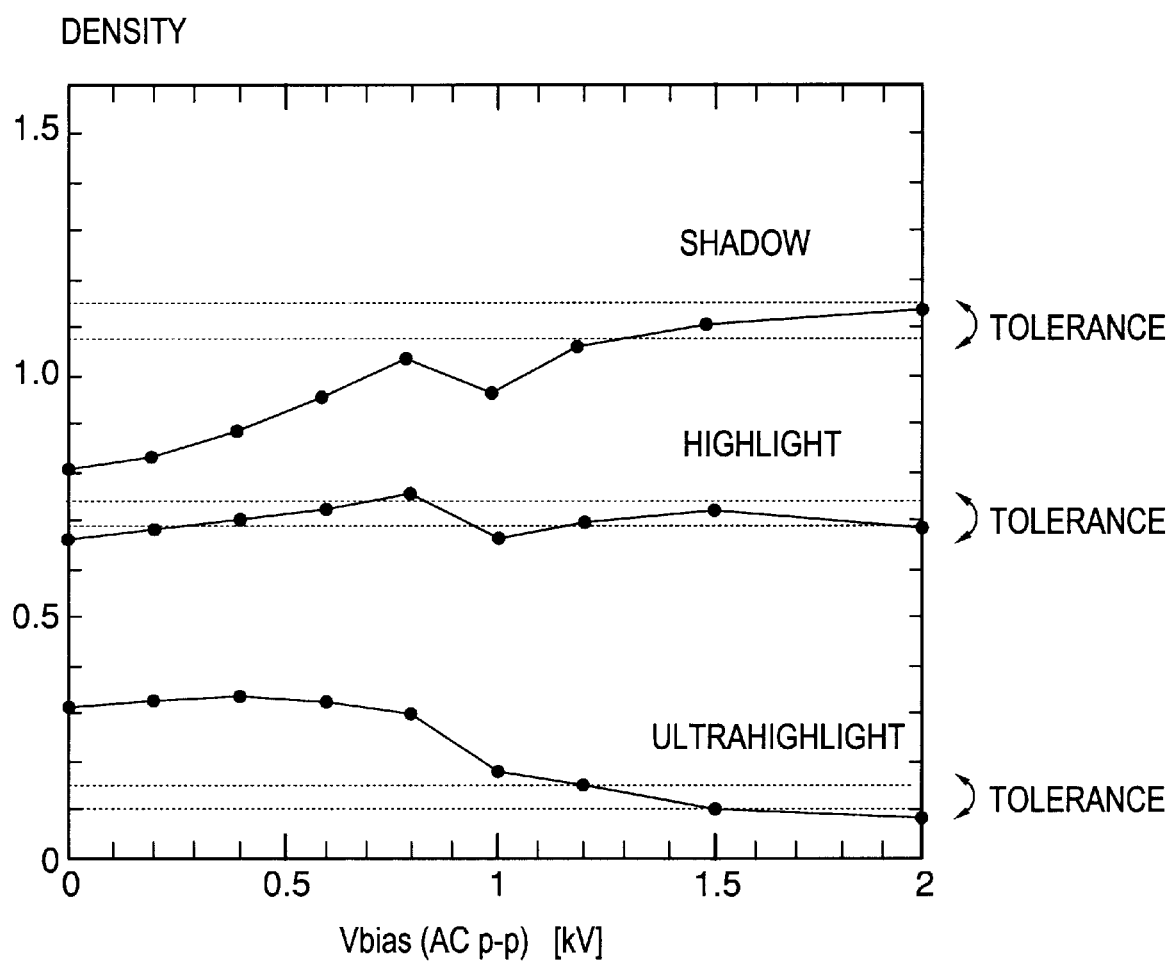

Fig. 22

| NO. | 1 | 2 | 3 | 4 | 5 | 6 | 7 | 8 | 9 | 10 |
|-----|---|---|---|---|---|---|---|---|---|----|
| VBpp | 250 | 240 | 230 | 220 | 210 | 200 | 190 | 180 | 170 | 160 |
| SC | 76 | 76 | 96 | 76 | 76 | 96 | 76 | 76 | 96 | 76 |
| LP | 98 | 108 | 98 | 98 | 108 | 98 | 98 | 108 | 98 | 98 |

COMBINATION OF
LP AND SC

PATTERN ①    PATTERN ③
    PATTERN ②

Fig. 26

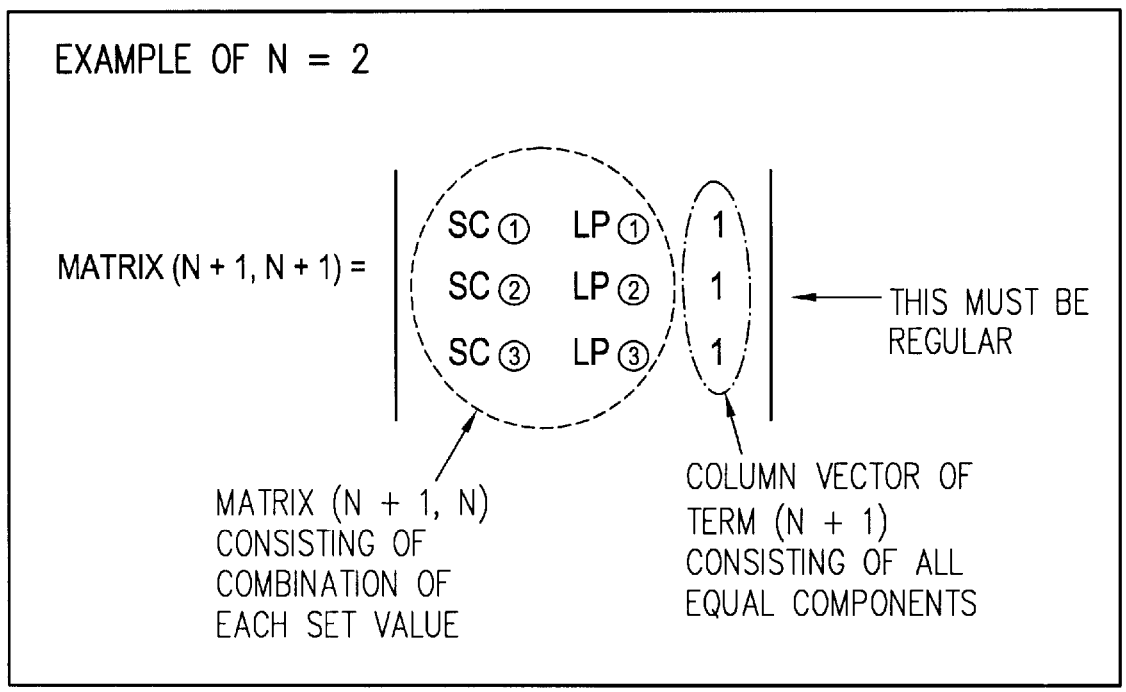

EXAMPLE OF N = 2

MATRIX (N + 1, N + 1) =

- MATRIX (N + 1, N) CONSISTING OF COMBINATION OF EACH SET VALUE
- COLUMN VECTOR OF TERM (N + 1) CONSISTING OF ALL EQUAL COMPONENTS
- THIS MUST BE REGULAR

Fig. 27

CALCULATION USING CONCRETE VALUES IN THIRD EMBODIMENT $$\begin{vmatrix} SC_1 & LP_1 & 1 \\ SC_2 & LP_2 & 1 \\ SC_3 & LP_3 & 1 \end{vmatrix}$$

= (SC₁ × LP₂ + SC₂ × LP₃ + SC₃ × LP₁)
  − (SC₁ × LP₃ + SC₂ × LP₁ + SC₃ × LP₂)
= (76 × 108 + 76 × 98 + 96 × 98)
  − (76 × 98 + 76 × 98 + 96 × 108)
= −200
≠ 0 → REGULAR

IMAGE FORMING APPARATUS

BACKGROUND OF THE INVENTION

The present invention relates to an image forming apparatus using the electrophotography method, and more particularly to an image forming apparatus capable of always obtaining uniform image quality by feedback controlling the image quality (particularly color and density) with a high degree of accuracy.

General Feedback Control

In various systems/apparatuses, feedback control is performed in order to allow output to always coincide with the target value. In order to improve the accuracy of the feedback control, detection is generally performed at all times (or frequently) to apply the feedback with a detection object with the highest degree of detection accuracy as a controlled variable.

In, for example, a motor, an encoder mounted to its rotating shaft directly detects the rotation speed accurately to perform error correction (PWM control: pulse width modulation control or the like) at all times. Also, in a constant temperature oven or the like, a temperature sensor always detects temperature errors to correct control a heater/cooler with a high degree of accuracy.

Thus, in a large number of systems/apparatuses, it is possible to directly detect their final output values always, and accurate feedback control is performed on the basis of the highly accurate detection results. On executing such detection/control, the user does not suffer any disadvantage usually.

Feedback Control of Image Forming Apparatus

In an image forming apparatus using the electrophotography method, the feedback control is always performed in order to obtain the target image quality. In particular, in an image forming apparatus for high image quality, highly accurate feedback control is required because the demand value for the stabilized image quality is high.

In contrast, major parameters (such as, for example, charged potential and exposure potential) were conventionally controlled to their respectively individual target values in each process of the electrophotography, but the final image did not always become the same as the target because of indirect control (the image was not detected). These were lowly accurate control methods (Japanese Published Unexamined Patent Application Nos. 63-177176, 63-177177, 63-177178 and the like).

Thus, there is proposed a method to directly detect a final image fixed on a sheet to thereby improve the detection accuracy, and as a result, to improve the control accuracy.

This method is roughly divided into two: one method is to output, in a digital copying machine equipped with an image reader or the like, a reference pattern once, and allow it to be read in the image reader manually for detecting the outputted image state as disclosed in Japanese Published Unexamined Patent Application Nos. 62-296669 and 63-185279 and the like.

The other method is to provide the output unit of an image forming apparatus with a sensor for exclusive use for detecting the reference pattern outputted (that is, the state of the outputted image) online as described in Japanese Published Unexamined Patent Application Nos. 4-055868 and 7-168412. This method has an advantage that it can be performed with any apparatus having no image reader such as a printer.

In any of these methods, however, an image for detection must be outputted in addition to the ordinary image output. From the user's standpoint, whose object is to obtain his desired image, anything else is not necessary except the desired image output or output of information significant for the user. Image output only for the control means wasteful use of a sheet, and yet the productivity is prevented during the detection operation.

Actually, this point is the greatest point of difference between the control of general systems/apparatuses and the control in the image forming apparatus, and is difficulty peculiar to the image quality control technique.

In other words, while final output with the highest detection accuracy can be detected always or frequently in the general systems/apparatuses, it is strongly requested in the image forming apparatus that the detection frequency of a fixed image, which is the final output, be zero or exceedingly low.

Conventional Countermeasure

In order to solve such a problem peculiar to the control of the image forming apparatus, the conventional technique intended to mainly cope with it by the following two methods. As described below, however, any of these methods has a great problem, which has not yet been solved.

The first method is to perform the control within a feedback control system separately provided, and to use the detection result for the final output image for the calibration thereof because it is actually impossible to use the detection of the final output image as input for the feedback control (because it cannot be accepted by the user to frequently output an image for detection) (because the calibration is far lower in frequency of execution than the image quality control).

As the feedback control system, the conventional control of the electrophotographic process (hereinafter, abbreviated to "procon"), that is, potential control using a potential sensor or development control (such as, for example, control of developing bias or laser power) using a development density sensor is used.

To be concrete, a reference pattern is prepared and detected mainly manually, it is compared with an output value from the potential sensor or an output value from the development density sensor which has been detected at the same time, and each sensor is calibrated or an image signal processing unit is corrected (particularly rewriting of a lookup table for correcting a tone reproduction curve).

Therefore, it is possible to control irrespective of the frequency of the final image detection, but the control itself of the outputted image is performed by the conventional procon, which is technique different from the original target. Also, although control errors of long duration are improved by calibration, any better improvement effect than the conventional technique cannot be obtained in the control performance in addition.

Moreover, the technique of two systems: procon system and calibration system will be required (sensors for exclusive use are required respectively), thus increasing the cost.

As the second method, there is conceivable a method to prepare a reference pattern for detection by applying a message sheet (such as a banner sheet for supplying print conditions, error information and the like in addition to the ordinary image output) which supplies necessary information to the user.

However, an ordinary message sheet is irregularly outputted, and yet only one sheet is issued for each output.

Accordingly, this method is only effective when the frequency of necessitating the reference pattern detection is exceedingly low (the same degree as the output frequency of the message sheet is sufficient) and yet all necessary patterns can be prepared/detected on one sheet.

Since, however, the conventional control was provided with only a function to correct an error detected to zero (if, for example, the density is low, correction is made so as to make the density higher by only the difference with the target density), the set value corrected became inadequate within a short time, should there be disturbance which changes within a short time like the temperature and humidity of the surrounding environment.

Also, particularly in the case of a color image, reference patterns for, for example, four colors of YMCK are required. In contrast, conventionally the system using one color sensor has generally been used as the reference pattern measuring means. For this reason, since reference patterns for all colors are arranged (in one line) on a sheet, the number of reference patterns which can be prepared/detected for each color reduces (in the case of each single color of YMCK, the number of reference patterns for each color is ¼ that in the case of a single color), thus causing the accuracy of control operation performed on the basis of the detection result to become low.

In other words, while the detection accuracy is improved using the final image, the outputted image has become unstable.

The problem to be solved by the present invention is to solve the problem peculiar to the control technique for an image forming apparatus as described above, and to detect the final outputted image without causing any disadvantage to the user for providing a technique capable of controlling/maintaining it constant with a high degree of accuracy at all times.

To be more concrete, this intends to solve the aforesaid problem by controlling a plurality of manipulated variables having different natures in the optimal manner respectively, and the preparation/detection of reference patterns necessary and sufficient for performing highly accurate feedback control particularly for the plurality of manipulated variables are all completed in one final output image. And yet, such set values for manipulated variables as to enhance the stabilized output image quality can be decided, whereby only a message sheet which is outputted irregularly and at low frequency is used as a sheet for preparation of the reference pattern. Thus, it intends to provide detection/control means capable of maintaining the image output constant with a high degree of accuracy at all times.

SUMMARY OF THE INVENTION

According to the present invention, in order to achieve the aforesaid object, in an image forming apparatus of the electrophotographic type for performing feedback control with a plurality of electrophotographic parameters as manipulated variables so that a controlled variable for image quality becomes a target value, for making the controlled variable stable with respect to predetermined environmental fluctuation in a predetermined stable area of a predetermined first electrophotographic parameter, and further for varying the controlled variable in the stable area of the first electrophotographic parameter by a predetermined second electrophotographic parameter, the following are arranged to be provided: means for setting the target value for the controlled variable; means for making a set value for the manipulated variable, variable; means for preparing a reference pattern while varying the first electrophotographic parameter over a range including the stable area, and varying the second electrophotographic parameter so as to act harmoniously with variations of the first electrophotographic parameter at least in a range including a value for the second electrophotographic parameter which sets the controlled variable in the stable area as the target value; reference pattern measuring means for measuring the controlled variable for the reference pattern; and means for determining a value for the first electrophotographic parameter in the stable area on the basis of the measured result by the reference pattern measuring means, and for further determining the value for the second parameter which causes the controlled variable in the value thus determined to correspond with the target value.

In this construction, the manipulated variable is constructed so as to include two types: the first electrophotographic parameter (parameter A) for mainly contributing to the stabilization of the output image, and the second electrophotographic parameter (parameter B) for mainly adjusting the absolute value of the controlled variable. The reference pattern is prepared/outputted while varying the parameter A, for example, linearly (continuously or discretely) and at the same time, varying the parameter B to two or more set values. This reference pattern is measured by the reference pattern measuring means to feedback control each manipulated variable on the basis of the correspondence relationship between the measured value by the reference pattern measuring means, its rate of change and the set values for each manipulated variable.

Generally, in the xerography, the variations in the output image corresponding to various changes in physical quantity are mostly non-linear, and there are an area where the influences by the respective changes in physical quantity appear as great output fluctuation, and an area where the influences appear as small output fluctuation. Also, there may exist a blind sector where the influences are hardly received. Probably, there is also an image forming apparatus which has been intentionally designed so as to constitute such a blind sector.

Therefore, the output stability in the image forming apparatus is improved by setting the electrophotographic parameter (the parameter A) concerning such physical quantity to an area having the least influence by the fluctuation.

In such a stable state, even in a case where, for example, the temperature-humidity environment or the like changes, the output image fluctuation becomes the least. Especially, when there exists a blind sector and it functions fully, the output stability is hardly affected.

However, normally such non-linear characteristic (here, especially the optimal value for parameter A) is not constant always, but gradually changes along with deterioration in the image forming apparatus with time or the like.

Judging from the above description, if the absolute value (for example, the value of density or the like) of the image quality is adjusted to the target value by the parameter B after the parameter A is set to the optimal value (at the time), the output image can be stably maintained in a predetermined state even when the external environmental conditions or the like vary within a short time, and therefore it does not become necessary to frequently prepare/detect the reference pattern for feedback correction.

On the other hand, as regards the change in the optimal value of the parameter A (So with parameter B) due to deterioration in the image forming apparatus itself with time, it can be solved by repeating the detection/correction before the influence by the deterioration with time actually appears (for example, within one day or within 1,000 prints after the last detection/correction).

The aforesaid construction serves to always maximize the output stability of the image forming apparatus because it is possible to detect an amount of fluctuation of the reference pattern when the parameter A is changed for setting the parameter A to such a value as to minimize the rate of change or to the center of the area.

Also, since the correspondence relationship (correction rule of the image quality absolute value) of the parameter B when the parameter A is any set value to the reference pattern can be obtained, the absolute value of the image quality can be caused to coincide with the target value by adjusting the parameter B.

Further, since the parameters A and B can be set to the optimal values respectively by feedback correction at a time, the stability of the output image quality can be maintained in its best state for a long period of time (until the influence by deterioration with time appears) after the feedback correction, and therefore, the preparation/detection frequency of the reference pattern can be greatly reduced.

Also, in this construction, on preparing the reference pattern, combinations of each set value for N (positive integer) types of second electrophotographic parameters are arranged to have at least (N+1) patterns, and with respect to matrix (N+1, N) consisting of combinations of each set value, matrix (N+1, N+1) obtained by combining column vectors of term (N+1) consisting of all equal components may include regular combinations.

In this way, it is possible to determine the optimal set value for each of N pieces of parameters collectively at the same time by the preparation/detection of a reference pattern at a time. More specifically, the change in the output image when each of N pieces of parameters B is changed, that is, the control rule of each parameter B is grasped as each coefficient for (N+1) pieces of linear simultaneous equations with N unknowns, and at this time, the solution for each of N pieces of parameters can be analytically determined.

Also, in the present invention, for the recording medium on which the reference pattern is written, only a sheet which is outputted discretely from ordinary image output to transmit information to the user may be used. In this case, since the recording medium on which the reference pattern is written is only a banner sheet for transmitting message such as, for example, the state of the image forming apparatus and error information to the user, no sheet exclusively used for the preparation of the reference pattern is needed at all.

Also, in the present invention, if the image forming apparatus main body is used as a color image forming apparatus, it may be possible to arrange the reference pattern in a line at different positions on a message sheet for each color, and to prepare the reference pattern measuring means for each color to install so as to coincide with the arrangement positions for each color on the reference pattern.

Here, the reference patterns usually used are patch images 1 to several centimeters square, and are arranged in one line in the sheet conveying direction so as to pass the reference pattern measuring means during image output.

For this reason, the number of patches arranged in one line on a sheet of message sheet with a finite length is limited. If patches about 20 mm square are arranged on, for example, a sheet of size A3 in the longitudinal direction (420 mm), the limit is 21 patches, and when these patches are allocated to four colors of YMCK, only about five kinds of patches can be prepared per color. That is, only five data can be used for correction control.

In contrast, if constructed as described above, three times (YMC) or four times (YMCK) data can be gathered, and even with only a sheet of message sheet, control operation with a high degree of accuracy can be performed on the basis of a large quantity of data.

Also, in the present invention, in the stable area for the first electrophotographic parameter, a plurality of physical fluctuations, which occur within the image forming apparatus main body, may be caused to operate so that they are offset with each other with respect to variations in the controlled variable. This offset enables stabilizing the output image although all the influences by the individual physical fluctuations are not nullified. In this case, the development process can be made into the two-component non-contact development.

Also, in the present invention, a fluctuation absorbing function having a mechanism constructed so as to absorb physical fluctuations which occur within the image forming apparatus main body may be maximized or optimized in the stable area for the first electrophotographic parameter. For this reason, the output image can be stabilized with the highest degree of accuracy or over a long period of time. Also, if the setting of the fluctuation absorbing mechanism causes a secondary obstacle to the other image quality, the secondary obstacle will be eliminated or minimized.

Also, in the present invention, the aforesaid parameter may be set so as to minimize the fluctuation of the controlled variable when the aforesaid parameter itself further fluctuates with respect to another electrophotographic parameter. When done in such a manner, there is such an action that the output image can be maintained constant even when the individual parameters themselves fluctuate (for example, due to variations in supply voltage, fluctuation in load or the like). In this case, for the development process, there can be used a development method using a saturated area based on restricted toner supply.

BRIEF DESCRIPTION OF THE DRAWINGS

FIG. 16 is a view showing set values for each manipulated variable when a banner sheet of the embodiment is prepared;

FIG. 18 is a graph showing the correspondence relationship between developing bias AC voltage and output image density according to a third embodiment of the present invention;

FIG. 22 is a view showing set values for each manipulated variable when a banner sheet for the embodiment is prepared;

FIG. 26 is an explanatory view for illustrating the operation of determining the optimal values for LP and SC set values in the embodiment; and FIG. 27 is an explanatory view for illustrating the operation of determining the optimal values for LP and SC set values in the embodiment.

DETAILED DESCRIPTION OF PREFERRED EMBODIMENTS

First Embodiment

The description will be made of a first embodiment of an image forming apparatus of the electrophotographic type to which the present invention applies.

This embodiment uses the two-component non-contact development, and the controlled variable is solid image density on a sheet after the fixing process. As the parameter A for mainly contributing to the stabilization, the developing bias AC (p-p) voltage value in the developer unit is used, and as the parameter B for adjusting the absolute value of solid image density, the developing roll rotating speed in the developer unit is used.

Also, this embodiment shows, specially as described in claim 5, an embodiment which is constructed such that a plurality of physical fluctuations, which occur within the image forming apparatus, offset each other with respect to the variations in the output image.

(1) Construction of Image Forming Apparatus

Figure 1:
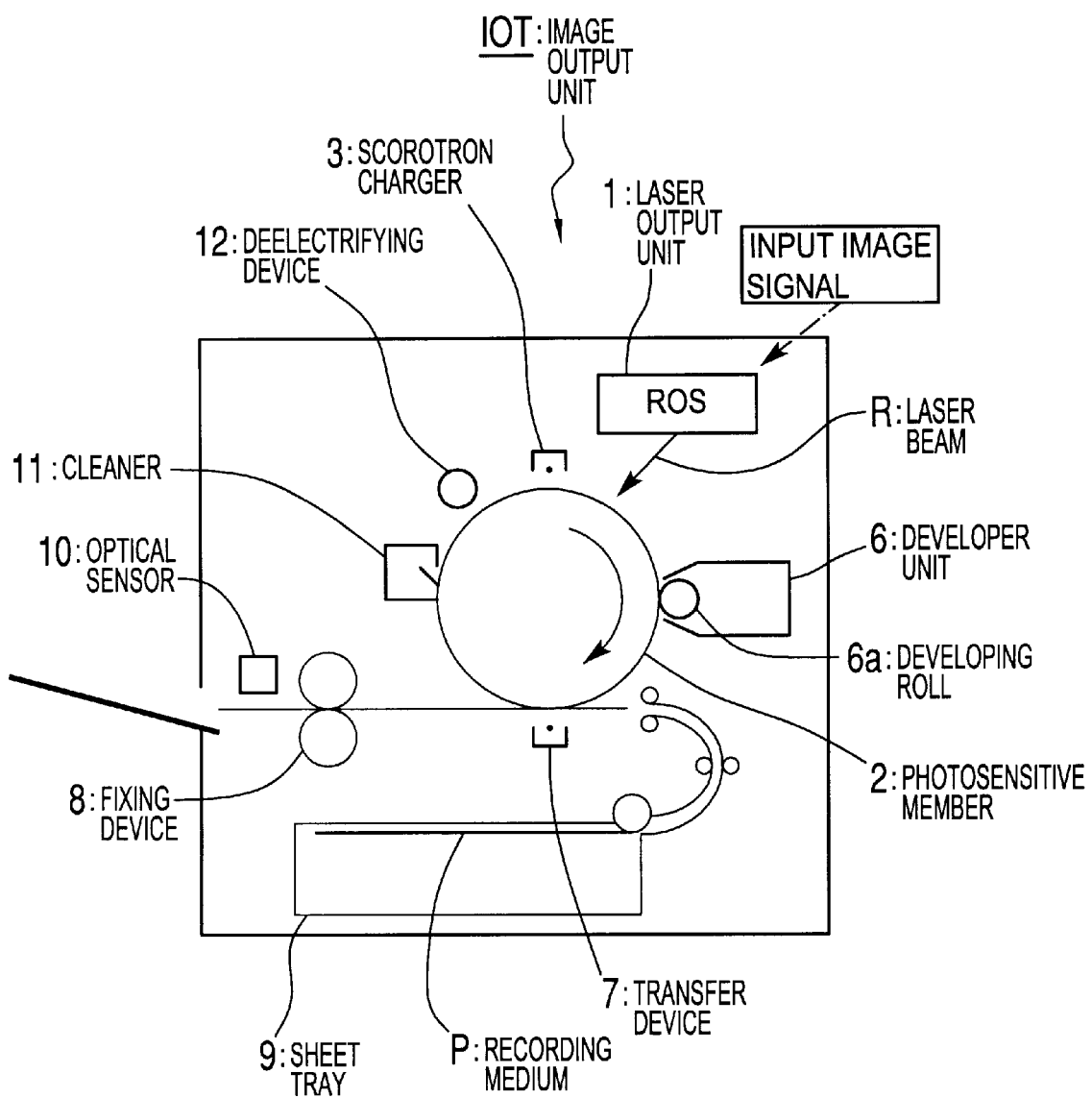
FIG. 1 is a structural view showing the outline of an image output unit in a first embodiment according to the present invention.

FIG. 1 shows the outline of an image output unit IOT (Image Output Terminal) of an image forming apparatus according to this embodiment. In this respect, an image reader and an image processing unit are omitted in FIG. 1. In other words, it shows only the image output unit IOT of the electrophotographic type.

The description will be made of the image formation procedure using FIG. 1.

The image processing unit (not shown) performs an appropriate process on an original image signal obtained by reading an original with an image reader (not shown) or preparing with an external computer (not shown) or the like. An input image signal thus obtained is inputted into a laser output unit 1 to modulate a laser beam R. The laser beam R thus modulated through the input image signal is raster radiated onto the photosensitive member 2.

On the other hand, the photosensitive member 2 is uniformly charged by the Scorotron charger 3, and when it is irradiated with a laser beam R, an electrostatic latent image corresponding to the input image signal is formed on its surface. Then, the electrostatic latent image is non-contact developed by the developer unit 6. On the other hand, with the supply of a recording medium P from the sheet tray 9, development toner is transferred onto the recording medium P by the transfer device 7, and is fixed by the fixing device 8. Thereafter, the photosensitive member 2 is cleaned by the cleaner 11, and the residual charge is deelectrified by the deelectrifying device 12 to complete one image forming operation.

The two-component non-contact development which characterizes this embodiment is a developing method, disclosed in, for example, Japanese Published Unexamined Patent Application Nos. 59-91453 and 60-126668, Japanese Published Unexamined Patent Application No. 3-2304 and the like, in which an electrostatic latent image on the photosensitive member is non-contact developed by a developer layer on the development sleeve in the developer unit.

Figure 2:
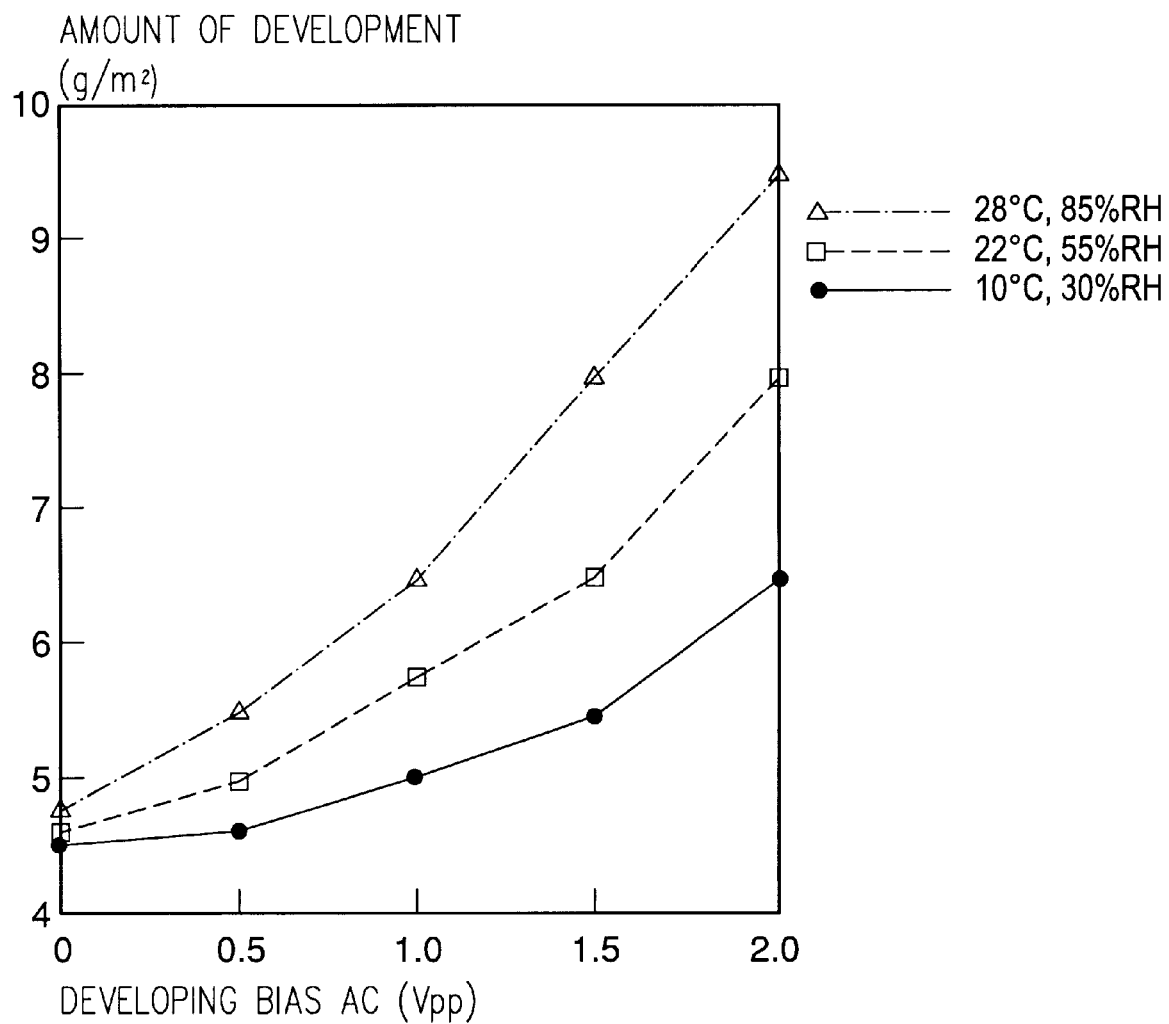
FIG. 2 is a graph showing environmental dependency of the amount of development in the two-component non-contact development of the embodiment.

In the two-component non-contact development, the amount of development closely related to output image density depends upon developing bias AC voltage and the toner charged quantity. The developing bias AC voltage depends upon the adhesion between toner and carrier, which depends upon the humidity, and becomes higher as the humidity increases. Therefore, in the case of the same toner charged quantity, the amount of development increases as shown in FIG. 2 as the temperature and humidity shift from high temperature and high humidity to low temperature and low humidity. As can be seen from FIG. 2, a ratio of the amount of development between environments differs with the value of developing bias AC voltage. On the other hand, the toner charged quantity decreases as the temperature and humidity increase, and increases as the temperature and humidity decrease because of frictional charge. On the contrary, the amount of development decreases as the temperature and humidity decrease, and increases as the temperature and humidity increase. Therefore, it becomes possible to restrain the fluctuation of the amount of development due to environmental fluctuation by applying, to the fluctuation of the toner charged quantity due to the environmental fluctuation, such developing bias AC voltage as to offset its influences.

Moreover, deterioration of developer with time causes the adhesion between toner and carrier and the toner charged quantity to further fluctuate. Since this fluctuation does not uniformly occur, it is necessary to control, to an optimal value, the developing bias AC voltage with the amount of development (=output image density) constant with respect to environmental fluctuation.

(2) Reference Pattern Preparing Mechanism and its Monitor Mechanism

The description will be made of the preparation of a reference pattern for controlling the image quality on a banner sheet in this embodiment and its monitor mechanism. On the banner sheet used in this embodiment, messages such as a name of document printed out and font information are displayed and a reference pattern for monitoring the output image density is formed. In this embodiment, the banner is arranged to be also outputted when the power supply for the apparatus is turned on and when the apparatus is set up as desired by the user, in addition to when information during print-out, which is the original object of use of the banner sheet, is conveyed.

Figure 3:
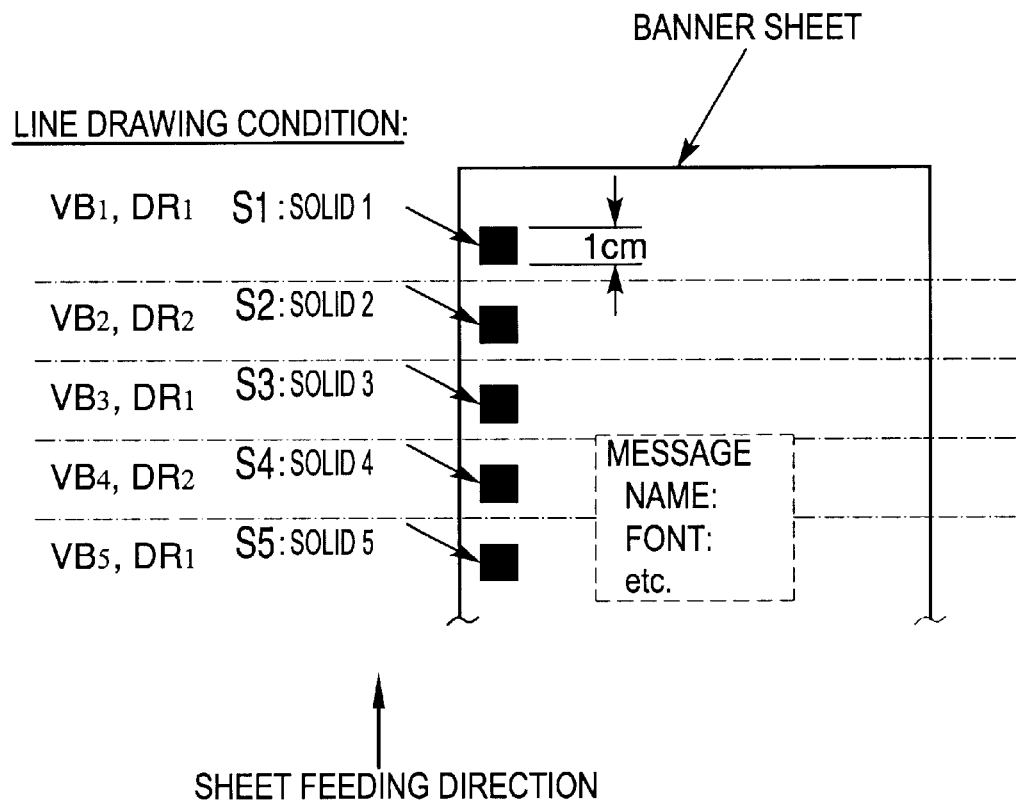
FIG. 3 is a schematic view showing a banner sheet of the embodiment.

The reference pattern adopts solid (=dot coverage 100%) density pattern as shown in FIG. 3. Any of the density patterns is set to size of about 1 cm square as shown in FIG. 3, and is repeatedly prepared while switching the set value for each manipulated variable as described later.

Figure 4:
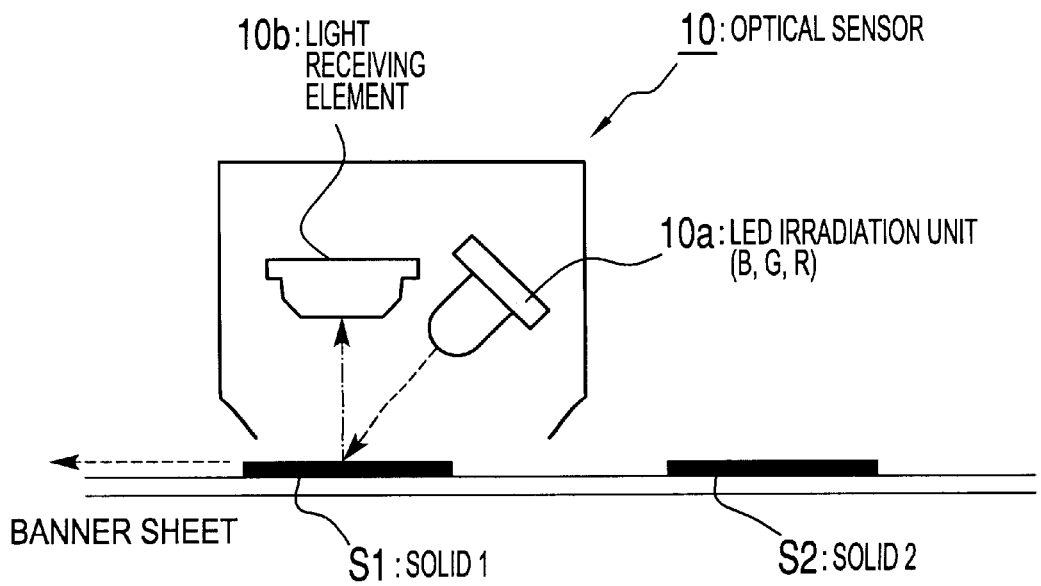
FIG. 4 is a structural view showing an optical sensor of the embodiment.

Also, an optical sensor 10 is, as shown in FIG. 4, composed of a LED irradiation unit 10a for radiating light onto the surface of a banner sheet, and a light-receiving element 10b for receiving diffused light from the surface of the banner sheet.

(3) Construction of Control Unit

Figure 5:
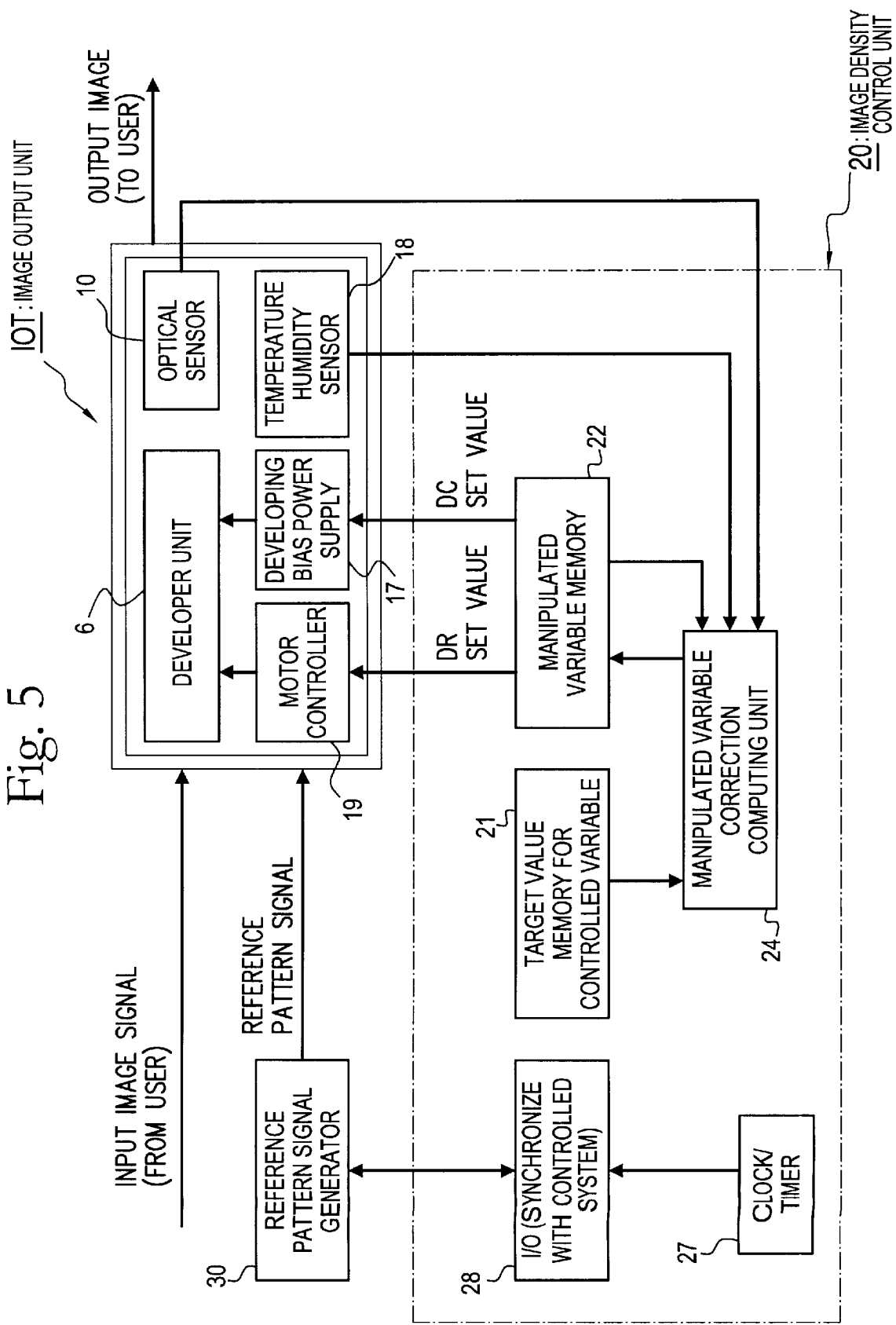
FIG. 5 is a block diagram showing the construction of an image density control unit 20 of the embodiment.

FIG. 5 is a block diagram showing the construction of a control unit 20 for controlling the rotating speed of the developing roll in the developer unit and the developing bias AC voltage.

In FIG. 5, numeral 21 designates a target value memory for controlled variables, which stores output converted values (in this embodiment, a value between "0" and "255") from the optical sensor 10 corresponding to the target density in the solid reference pattern therein.

On the other hand, read values from the optical sensor 10, temperature and humidity information within the image forming apparatus using the temperature and humidity sensor 18, and set values for manipulated variables within a manipulated variable memory 22 are inputted into a manipulated variable correction computing unit 24 to perform correction operation for manipulated variables in this computing unit as described later.

As the manipulated variables, there are, in the case of this embodiment, a peak-to-peak set value (0 to 255, hereinafter, abbreviated to VBpp set value) for the developing bias AC voltage of the developer unit for securing a stable area with respect to environmental fluctuation, and a set value for the rotating speed of the developing roll (0 to 255, hereinafter, abbreviated to DR set value) of the developer unit for adjusting the absolute value.

Also, VBpp set values and DR set values during the preparation of a banner sheet and during ordinary image output are stored in the manipulated variable memory 22 respectively in such a manner that a value corresponding to an output signal from a manipulated variable correction computing unit 24 is read out appropriately. The VBpp set value read out from the manipulated variable memory 22 is supplied to developing bias power supply 17, whereby the developing bias power supply 17 applies the AC voltage corresponding to the VBpp set value to the developer unit. Also, the DR set value read out from the manipulated variable memory 22 is supplied to a motor controller 19, whereby the motor controller 19 causes the developing roll in the developer unit to rotate at a rotating speed corresponding to the DR set value.

On the other hand, a reference pattern signal generator 30 is a circuit for directing the preparation of a solid density pattern on a banner sheet, and outputs a calibration reference pattern signal to the image output unit IOT at reference pattern preparing timing when the banner sheet is outputted. Thus, the reference pattern shown in FIG. 3 is prepared.

The operation timing of the reference pattern signal generator 30 is controlled by an I/O adjustment unit 28. The I/O adjustment unit 28 monitors a time signal outputted by a clock timer 27 when the banner sheet is outputted, and supplies an operation timing signal to the reference pattern signal generator 30 so as to form a solid density patch at a predetermined position.

(4) Operation of Image Forming Apparatus

Figures 6, 7:
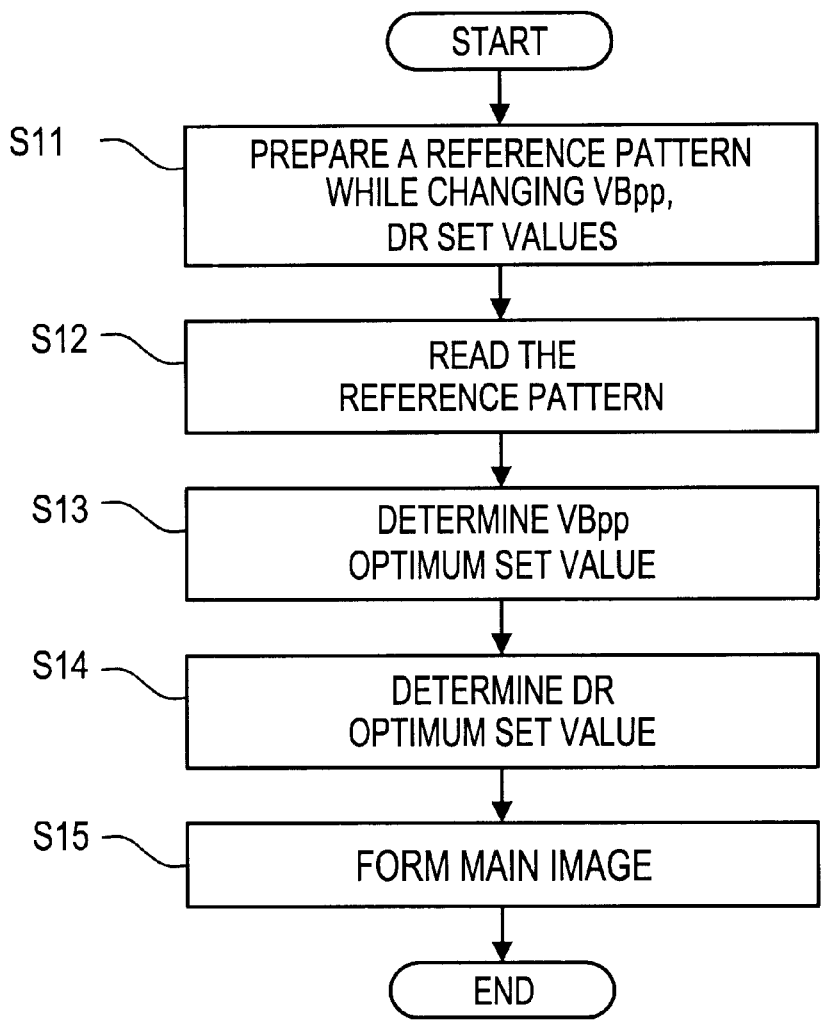
FIG. 6 is a flow chart showing the operation of the embodiment.
FIG. 7 is a view showing set values for each manipulated variable when a banner sheet of the embodiment is prepared.

Next, the description will be made of the operation of this image forming apparatus based on the aforesaid construction mainly using FIG. 6.

First, a reference pattern is prepared on a banner sheet while varying the VBpp and DR set values (S11). A method of varying the VBpp and DR set values is to set the DR set value, which is a parameter for adjusting the absolute value, repeating at two points while linearly (at a constant rate) varying the VBpp set value, which is a parameter for contributing to the stabilization as shown in FIG. 7. At this time, one of the DR set values is fixed as a standard set value. The density of the reference pattern thus formed is measured by a sensor (S12).

Figure 8:
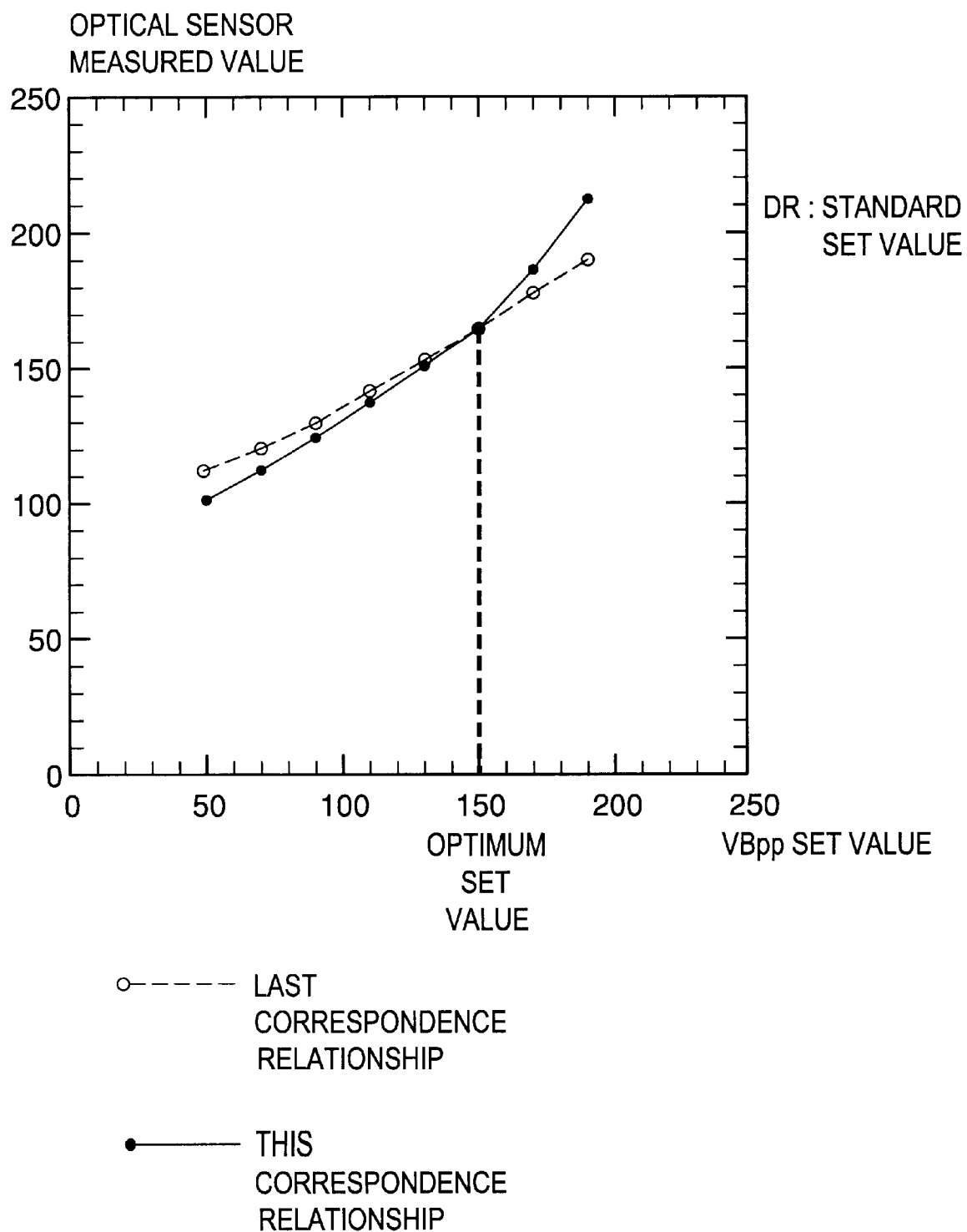
FIG. 8 is an explanatory view for illustrating the operation of determining the optimal value for the VBpp set value in the embodiment.

Next, the optimal set value for the VBpp set value is determined (S13). This is determined from the correspondence relationship between this VBpp set value when the DR set value is set to the standard set value and the solid density, and the correspondence relationship obtained during the last set-up. As previously described, in the two-component non-contact development, there exists the optimal value for developing bias AC voltage at which the output image density does not fluctuate with respect to environmental fluctuation. If the degree of the deterioration with time last time is regarded as substantially the same as that this time and no fluctuation due to the deterioration is taken into consideration, the developing bias value at which the last correspondence relationship coincides with this correspondence relationship falls under a stable area in which the output image density does not fluctuate due to environmental fluctuation. Therefore, if a difference in temperature and humidity between last time and this time is not lower than the reference value, a developing bias set value, which becomes an intersection in the correspondence relationship between last time and this time, is set to the optimal value (FIG. 8). If the difference in temperature and humidity between last time and this time is not higher than the reference value, the last correspondence relationship substantially coincides with that this time, and therefore, for the VBpp set value, the last optimal value is set as it is.

Figure 9:
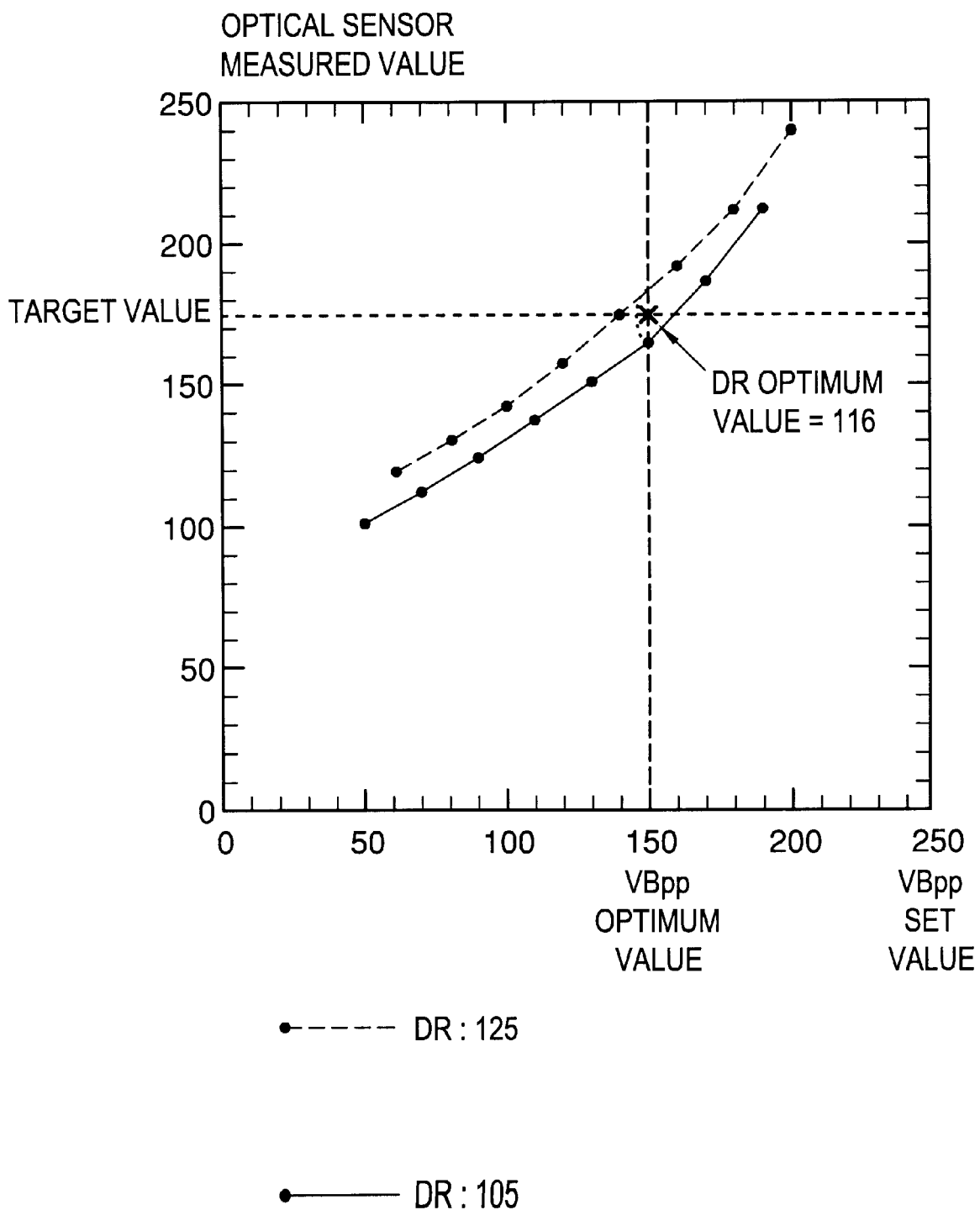
FIG. 9 is an explanatory view for illustrating the operation of determining the optimal value for DR set value of the embodiment.

Next, in order to achieve the target value for solid density, the optimal value for DR set value is determined (S14). density, the optimal value for DR set value is determined (S14). This can be determined by proportional distribution between solid density when the VBpp optimal set value for each DR set value is used and target solid density (FIG. 9). When expressed in equation, $$\frac{(DT-D1)}{(D2-D1)} = \frac{(DR-DR1)}{(DR2-DR1)} \qquad \text{(Numerical Formula 1)}$$

where DR: Optimal value for DR set value, DR1: DR set value 1, DR2: DR set value 2, DT: Target value for solid density, D1: Solid density for DR1 at VBpp optimal value, D2: Solid density for DR2 at VBpp optimal value. Solving this with respect to DR, $$DR = \frac{(DT - D1)}{(D2 - D1)}(DR2 - DR1) + DR1 \quad \text{(Numerical Formula 2)}$$

By substituting the target density, the DR set value and the measured density in this formula, the optimal value for the DR set value can be calculated. In FIG. 9, DR=116 becomes the optimal set value.

Thus, the optimal VBpp set value and DR set value for realizing the solid density to a desired value can be determined by set-up. These set values are used to form the main image (S15).

Thus, a series of control operations are completed. Thereafter, similarly the optimal set value for manipulated variable to realize the target density is set to perform accurate image control.

In the aforesaid embodiment, such modifications as described below are possible.

① In this embodiment, the two-component non-contact development has been exemplified and described, but this is only one instance among many, and the present invention is effective for any image forming apparatus in which a plurality of physical fluctuations occurring within the image forming apparatus main body operate so as to offset with each other with respect to changes in controlled variables.

② In this embodiment, parameter B is set by being repeated at two points while parameter A is being continuously allocated once, but a method of allocating parameters A and B is not limited thereto. It may be possible to continuously increase parameter A for allocating with parameter B fixed to a certain value, and thereafter to continuously decrease parameter A for allocating with parameter B switched to another value. The parameters A and B may be changed in any way so long as the necessary patch is kept within a sheet of banner sheet.

③ In this embodiment, the parameter A is changed linearly and discretely at a constant rate, but the change width of the parameter A may not be constant. For example, it may be possible to switch the change width of parameter A for each set value of parameter B for preparing the patch. Such a set value as to cause the rate of change in measured density with respect to parameter A to be determined may be used.

④ In this embodiment, although the description has been made of a case where there is one parameter B, the present invention is not limited thereto, but is applicable to cases where there are two or more parameters B. In this case, it will suffice if the respective parameters are changed so as to form patch images in such combinations that the rates of change in controlled variables to changes in the respective set values for parameters B can be determined.

⑤ In this embodiment, although a banner sheet has been used for preparation of the reference pattern, it may be possible to use a sheet exclusively used for the reference pattern for preparing the reference pattern when the exclusive sheet is available, or for any user who does not use any banner sheet, or the reference pattern may be prepared/detected in an intermediate stage of the image forming process such as a developing patch on a photosensitive member.

Second Embodiment

The description will be made of a second embodiment of an image forming apparatus of the electrophotographic type to which the present invention applies.

An image forming apparatus according to this embodiment is an image forming apparatus of the tandem color electrophotography method having a xerography engine for each of YMCK colors for forming an electrostatic latent image by irradiation of laser beams after the surface of a photosensitive member is uniformly charged by a Scorotron charger, and for developing this electrostatic latent image by toner, and further uses the restricted toner supply development and the simultaneous transfer and fixing method using heating.

In this embodiment, as the controlled variable, solid image density on a sheet after the fixing process is used, as the parameter A for mainly contributing to the stabilization, the developing bias DC voltage value of the developer unit is used, and as the parameter B for adjusting the absolute value of the solid image density, the rotating speed of the developing roll in the developer unit is used.

Also, in this embodiment, the reference pattern is arranged in one line at different positions on a message sheet for each color, and the reference pattern measuring means is prepared for each color, and is arranged in coincidence with the arrangement position of each color on the reference pattern. Also, the control is arranged to be performed so that the fluctuation absorption function of a mechanism (restricted toner supply development) constructed so as to absorb fluctuations occurring within the image forming apparatus is maximized and optimized.

(1) Construction of Image Forming Apparatus

Figure 10:
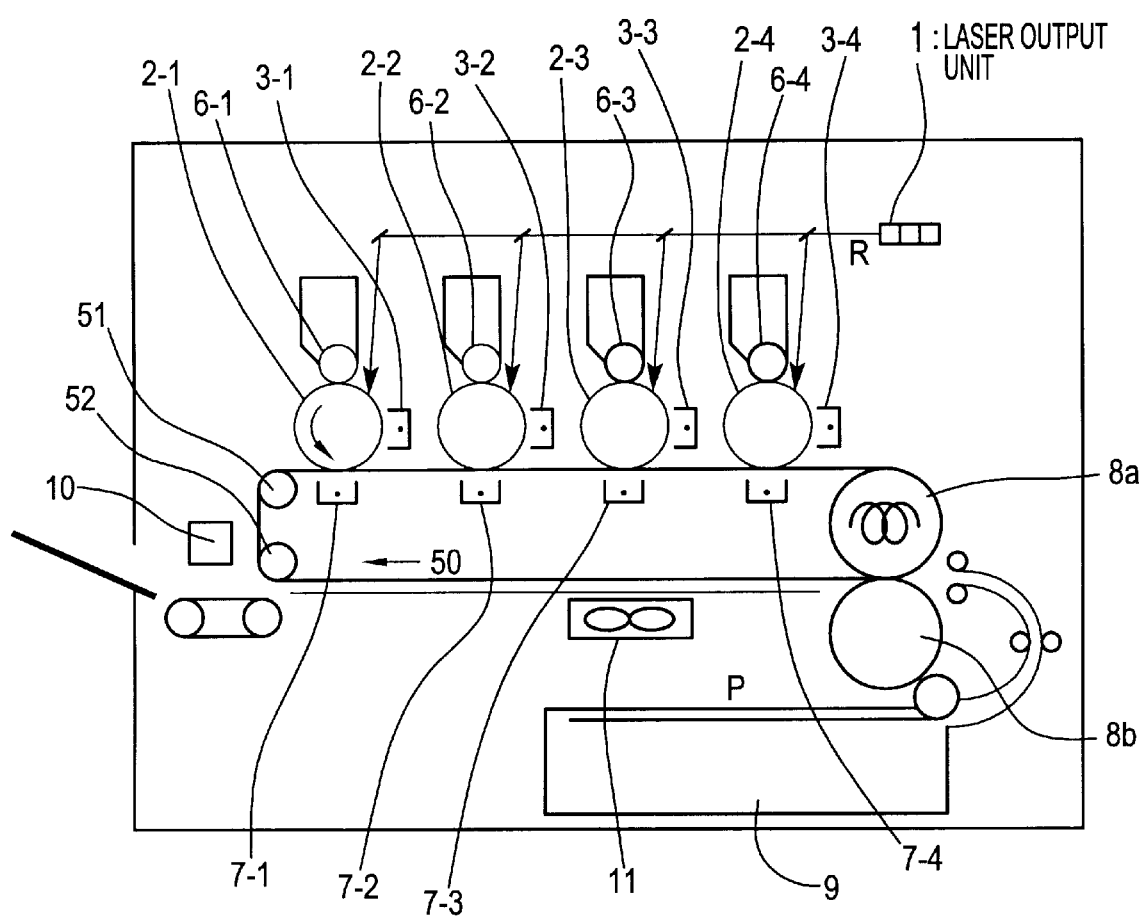
FIG. 10 is a structural view showing the outline of an image output unit in a second embodiment according to the present invention.

First, FIG. 10 shows the outline of the image output unit IOT (Image Output Terminal) of an image forming apparatus of this embodiment. In this respect, in FIG. 10, the image reader and the image processing unit are omitted. That is, only the image output unit IOT of the electrophotographic type is shown.

The description will be made of the image forming procedure using FIG. 10. First, an image processing unit (not shown) performs an appropriate process on an original image signal obtained by reading the original by an image reader (not shown) or by preparing by an external computer (not shown) or the like. The input image signal thus obtained is inputted into a laser output unit 1 to modulate the laser beam R. The laser beam R thus modulated by the input image signal is raster radiated onto four photosensitive members 2-1, 2-2, 2-3 and 2-4.

On the other hand, these four photosensitive members are uniformly charged by Scorotron chargers 3-1, 3-2, 3-3 and 3-4, and when the laser beam R is radiated, electrostatic latent images corresponding to the input image signals are formed on their surface. Then, the toner images developed by developer units 6-1, 6-2, 6-3 and 6-4 are formed. This toner image of each color is in turn electrostatically transferred onto the intermediate transfer member 50 by transfer devices 7-1, 7-2, 7-3 and 7-4.

The intermediate transfer member 50 is supported by the rolls 51 and 52, and the heating roll 8*a* to rotate in the arrowed direction. The heating roll 8*a* is temperature-controlled so that the fixing temperature becomes substantially constant. A compression roll 8*b* is arranged facing to the heating roll 8*a*. The compression roll 8*b* is urged against the heating roll 8*a* with the supply of a recording medium P from a sheet tray 9. Thereafter, the intermediate transfer member 50 holding a toner image and the recording medium P move between the heating and compression rolls with the timing coincided to be pressurized and heated. The toner heated over the melt temperature is softened and melted to percolate through the recording medium P. Thereafter, the intermediate transfer member 50 and the recording medium P are cooled by a cooler 11, and the recording medium P is peeled off from the intermediate transfer member 50 by the strength of the recording medium body P itself at a roll 52 having a small curvature radius to form a color image.

Hereinafter, the detailed description will be made of the constituent elements characterized by this embodiment.

(Photosensitive Member)

Figure 11:
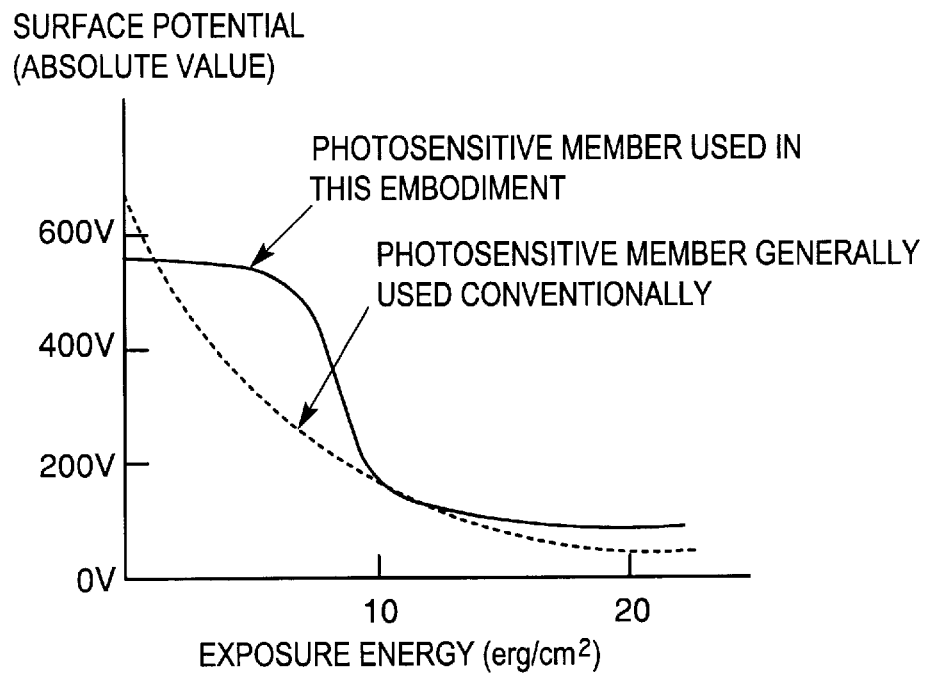
FIG. 11 is a graph showing photo-potential attenuation characteristics of a photosensitive member used for the embodiment and a photosensitive member of the prior art.

In the photosensitive members 2-1 to 2-4 used in this embodiment, the lowered absolute value of surface potential of the photosensitive member with respect to the increase in the energy of laser beam R for radiating the charged photosensitive member has characteristics which draw a curve having a point of inflection at predetermined light energy, and the photosensitive member has such photosensitive characteristics (solid line) as shown in FIG. 11. For comparison, the photosensitive characteristics of a functional separation type photosensitive member using organic semiconductor generally used conventionally are shown in a broken line in addition. The photosensitive member itself having S-shaped photo-potential attenuation characteristic having the point of inflection like this photosensitive member is well known, and one disclosed in, for example, Japanese Published Unexamined Patent Application No. 1-169454 or the like can be used.

(Developer Unit)

Figure 12:
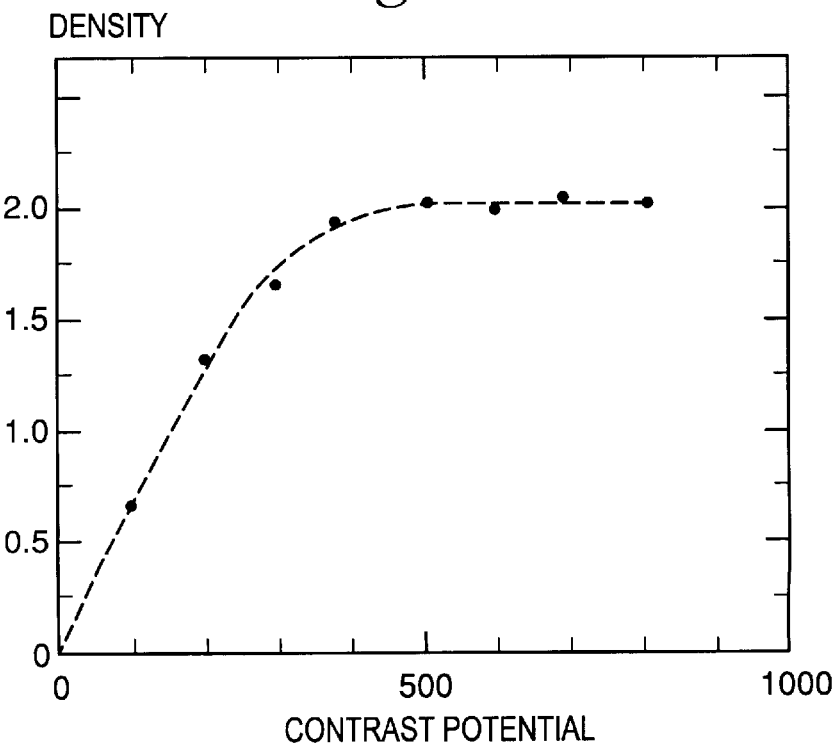
FIG. 12 is a graph showing the development characteristics of the restricted toner supply development used for the embodiment.

The developing means used in this embodiment is a developing method showing saturation characteristic properties using restricted toner supply with respect to a binarized latent image (FIG. 12). The DC voltage of developing bias applied to the developing roll is set so that the amount of developing toner is sufficiently saturated with respect to the contrast potential (potential difference between the photosensitive member surface potential of the exposure portion and the DC voltage of developing bias). The toner-carrier mixing ratio in the developer unit is 8% (weight ratio). Further, the toner consumption is presumed in response to an image signal inputted from the image processing unit to supply toner, whereby the toner-carrier mixing ratio is kept substantially constant.

The restriction on toner supply is made possible by increasing the carrier conductivity in, for example, the two-component development.

In this restricted toner supply development, environmental fluctuation fluctuates the threshold of the saturated area. To be concrete, the lower the temperature and humidity become, the threshold shifts toward higher contrast potential, and on the contrary, the higher the temperature and humidity become, the threshold shifts toward lower contrast potential. In order to always secure the saturated area with respect to changes in temperature and humidity, it is preferable to set the contrast potential as high as possible.

On the other hand, when the contrast potential is raised too high, fog is prone to occur in the background portion. It is preferable to lower the contrast potential in terms of the fog. To this end, there exists an optimal contrast potential capable of securing the stable area and further preventing the fog from occurring even if there may be environmental fluctuation.

Further, the deteriorated developer causes the threshold of the saturated area to shift toward lower contrast potential. In addition, the deterioration causes fog to easily occur even at the same cleaning potential (potential difference between the charged potential of the photosensitive member and the DC voltage of developing bias). For this reason, if the developing bias is fixed at such a value that the contrast potential becomes optimal in the initial state, the fog more easily occurs with the deteriorated developer. In views of securing the stable area and preventing any image quality defect, the set value for developing bias must be shifted toward lower contrast potential to cope with the deteriorated developer. Therefore, the developing bias is controlled so as to become the current optimal value.

(Intermediate Transfer Member)

In this embodiment, in order to non-electrostatically transfer a toner image onto a recording medium, the simultaneous transfer and fixing method based on heating using an intermediate transfer member belt is adopted. Further, the volume resistivity of the intermediate transfer member is optimized, whereby the transfer ratio on primarily transferring a toner image on the photosensitive member onto the intermediate transfer member is made the same between a single color and a secondary color or more.

For the intermediate transfer member 50, one having two-layer construction consisting of a base layer and a surface layer was used.

For the base layer, 70 $\mu$m thick polyimide film with carbon black added was used. In this embodiment, in order to electrostatically transfer a toner image from the photosensitive member onto the intermediate transfer member without any image turbulence, the volume resistivity of the base layer was adjusted to $10^{10}$ $\Omega$ cm by varying the amount of addition of carbon black. In this respect, as the base layer, it is possible to use, for example, a 10 to 300 $\mu$m thick, high heat-resistant sheet can be used, and a polymer sheet such as polyester, polyethylene terephthalate, polyether sulfone, polyether ketone, polysulfone, polyimide, polyimide amide, and polyamide can be used.

Also, in order to electrostatically transfer a toner image from the photosensitive member onto the intermediate transfer member without turbulence, the volume resistivity of the surface layer is adjusted to $10^{14}$ $\Omega$ cm, and in order to improve the tight contact between the intermediate transfer member and the recording medium with the toner image interposed therebetween on transferring from the intermediate transfer member onto the recording medium for fixing at the same time, a 50 $\mu$m thick silicone copolymerizate having rubber hardness of 40 degrees was used. The silicone copolymerizate is optimal for the surface layer because it has elasticity, its surface shows adherence to toner at normal temperature, and it further has a property to cause the toner, which has melted and fluidized, to easily release in order to effectively shift the toner to the recording medium. In this respect, for the surface layer, for example, a 1 to 100 $\mu$m thick resin layer having a high level of mold release characteristics can be used, and for example, tetrafluoroethylene-purfreoroalkyl-vinyl-ether copolymer, polytetrafluoroethylene or the like can be used.

An image forming apparatus of this embodiment constructed as described above performs the control with the developing bias voltage in the developer unit and the developing roll rotating speed as manipulated variables so that the fixed image density (solid density) for each single color of YMCK, which are controlled variables, becomes the target value within the saturated area.

Here, in order to keep the image density outputted at the target value, according to the present invention, a reference pattern is prepared on a recording medium to measure online after the final image formation process. On preparing this reference pattern, a banner sheet is used in this embodiment. Here, the banner sheet is a sheet which is outputted to convey messages such as the state of the image forming apparatus, the name of an output document and error information discretely from ordinary image output (image output when the user prints or copies a necessary pattern). In this respect, numeral 10 designates an optical sensor, which detects online the density of a reference pattern for controlling the image quality to be formed on a banner sheet.

(2) Reference Pattern Preparing Mechanism and its Monitor Mechanism

Here, the description will be made of the preparation of a reference pattern for controlling the image quality on a banner sheet in this embodiment and its monitor mechanism. On the banner sheet used for this embodiment, messages such as the name of a document printed out and font information are displayed, and a reference pattern for monitoring the output image density is formed. In this embodiment, the banner sheet is also outputted when the power supply is turned on and when set-up is performed in addition to when information during the print-out, which is the original use purpose of the banner sheet, is conveyed.

Figure 13:
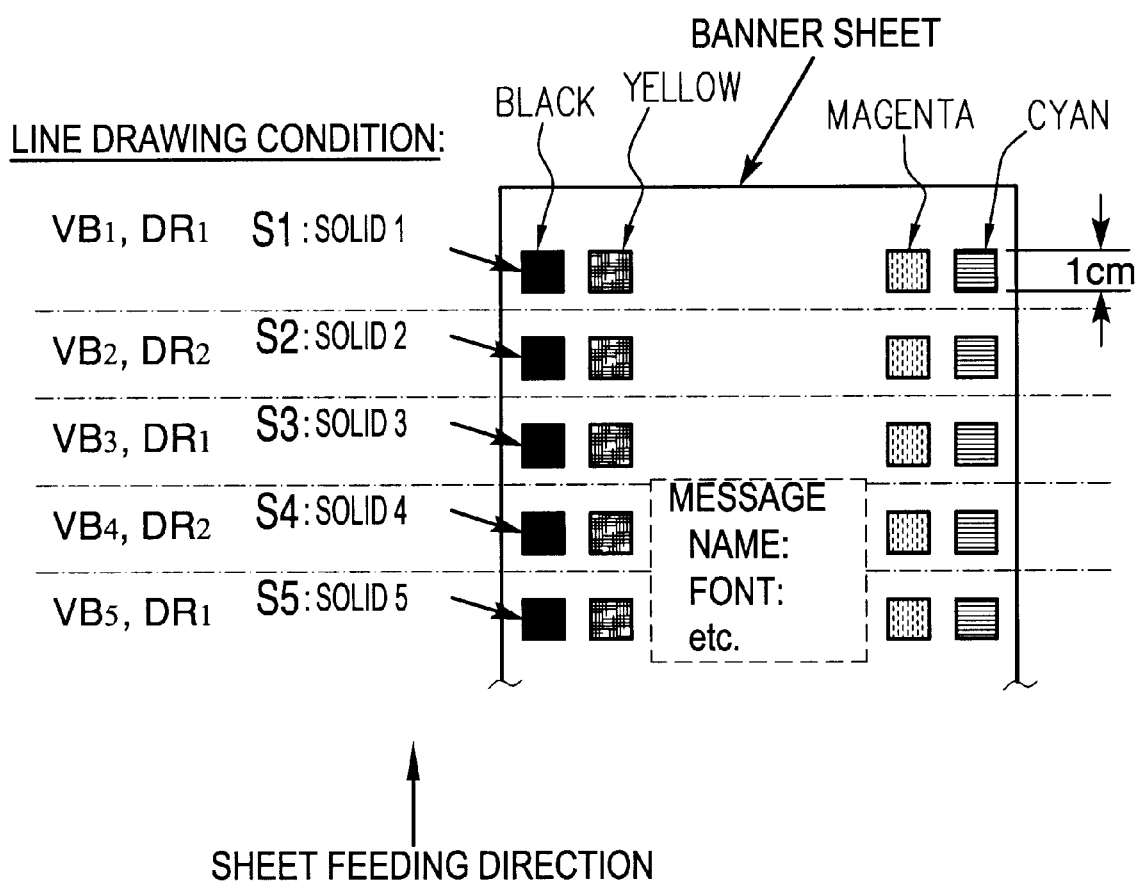
FIG. 13 is a schematic view showing a banner sheet for the embodiment.

For the reference pattern, a solid (dot coverage 100%) density pattern of each single color of black, yellow, magenta and cyan is used as shown in FIG. 13. Each of these density patterns is, as shown in FIG. 13, set to size of about 1 cm square, and a plurality of patterns are prepared while switching each set value for manipulated variables as described later.

The optical sensor 10 has the same structure as in the first embodiment, and is composed of a blue, green, or red LED irradiation unit 10a for radiating light onto the surface of a banner sheet, and a light-receiving element 10b for receiving diffused light from the surface of the banner sheet. The yellow pattern is irradiated with the blue LED, the magenta pattern, with the green LED, and the cyan pattern, with the red LED respectively. Further, as regards the black pattern, any illuminating light of the blue, green, red or white light may, in principle, be used, and in this embodiment, the red LED having higher sensitivity of the light receiving element is used for illumination.

(3) Construction of Control Unit

Figure 14:
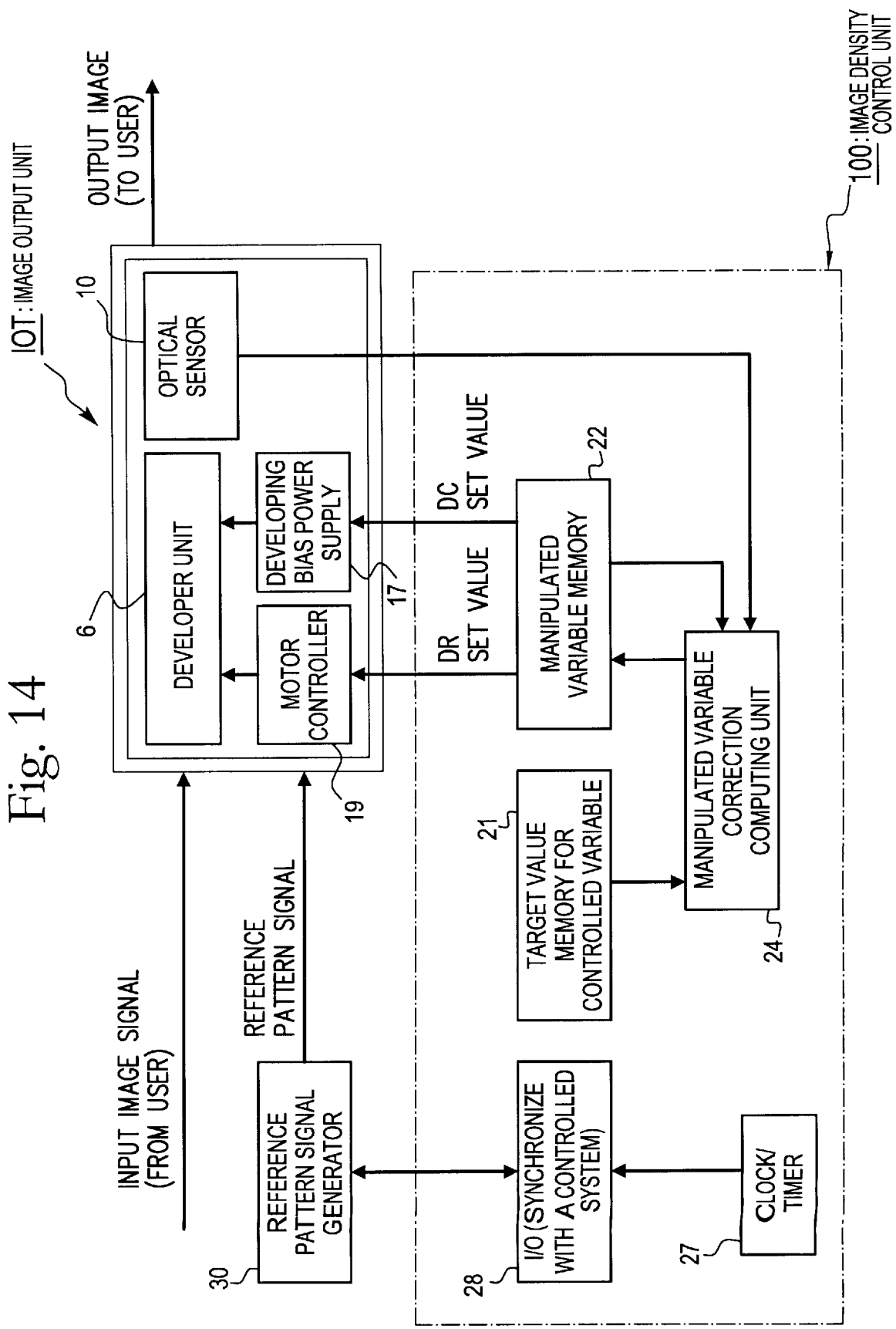
FIG. 14 is a block diagram showing the construction of an image density control unit 100 of the embodiment.

FIG. 14 is a block diagram showing the construction of the control unit 100 for controlling the rotating speed of the developing roll and the developing bias voltage in the developer unit. Although there are control units for four colors, each color has the same operation, and therefore, the black pattern will be exemplified and described here.

In FIG. 14, numeral 21 designates a target value memory for controlled variable, which stores output converted values (in the case of this embodiment, a value between "0" and "255") from the optical sensor 10 corresponding to the target density in the solid reference pattern therein.

On the other hand, read values on the optical sensor 10, and set values for manipulated variables within a manipulated variable memory 22 are inputted into a manipulated variable correction computing unit 24 to perform correction operation for manipulated variables in this computing unit as described later.

As the manipulated variables, there are, in the case of this embodiment, a set value (0 to 255, hereinafter, abbreviated to DC set value) for DC voltage for the developing bias of the developer unit for securing a stable area, and a set value (0 to 255, hereinafter, abbreviated to DR set value) for rotating speed of the developing roll of the developer unit for adjusting the absolute value.

Also, the DC set value and the DR set value during preparation of a banner sheet and during ordinary image output are stored in the manipulated variable memory 22 respectively in such a manner that a value corresponding to the output signal from the manipulated variable correction computing unit 24 can be read out appropriately. The DC set value read out from the manipulated variable memory 22 is supplied to developing bias power supply 17, whereby the developing bias power supply 17 applies the DC voltage corresponding to the DC set value to the developer unit. The DR set value read out from the manipulated variable memory 22 is supplied to a motor controller 19, whereby the motor controller 19 causes the developing roll in the developer unit to rotate at a rotating speed corresponding to the DR set value.

On the other hand, a reference pattern signal generator 30 is a circuit for directing the preparation of a solid density patch on a banner sheet, and outputs a calibration reference pattern signal to the image output unit IOT at reference pattern preparing timing when the banner sheet is outputted. Thus, the reference pattern shown in FIG. 14 is prepared.

Figure 15:
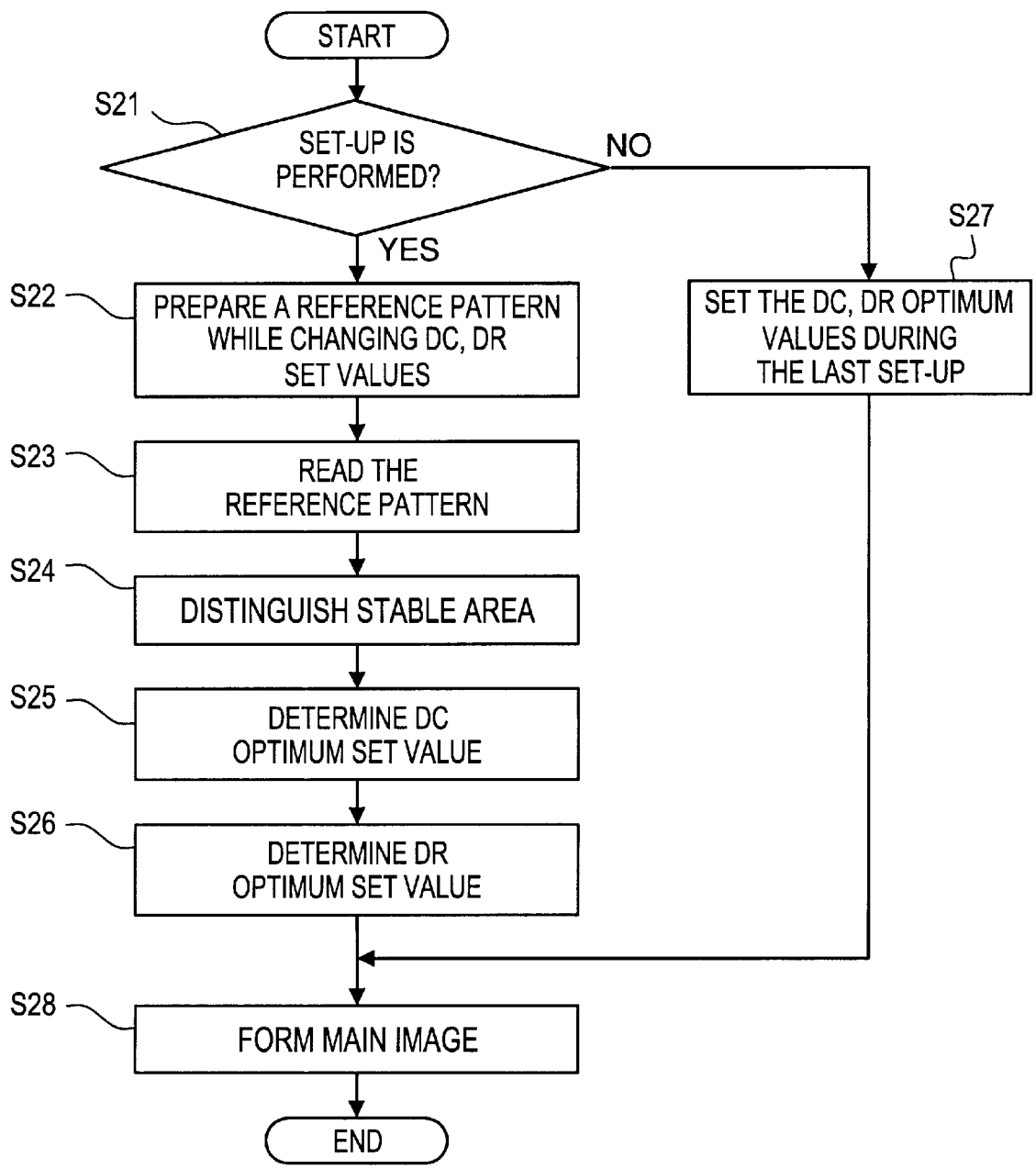
FIG. 15 is a flow chart showing the operation in the embodiment.

The operation timing of the reference pattern signal generator 30 is controlled by an I/O adjustment unit 28. The I/O adjustment unit 28 monitors a time signal outputted by a clock timer 27 when a banner sheet is outputted, and supplies an operation timing signal to the reference pattern signal generator 30 so as to form a solid density patch at a predetermined position (4) Operation of the Image Forming Apparatus Next, the description will be made of the operation of this image forming apparatus based on the aforesaid construction mainly using FIG. 15.

When the power is turned on to the apparatus, when it is instructed by the user to set up the apparatus, or when it is instructed to output an ordinary image, the control operation is started, and whether or not the set-up is performed is judged (S21).

When the power is turned on to the apparatus, it is judged that the set-up will be performed (yes). When it is instructed by the user to set up the apparatus, it is also judged that the set-up will be performed (yes). However, when it is instructed to output an ordinary image, it is compared whether or not the elapsed time since the last set-up is within the specified time. At this time, if the specified time is exceeded, it is judged that the set-up will be performed, and the set-up is performed when the banner sheet is outputted (yes). On the other hand, if within the specified time, the set-up will not be performed (no), but the DC, DR optimum values during the last set-up stored in the manipulated variable memory are used to form the main image (S27, S28).

Figure 17A:
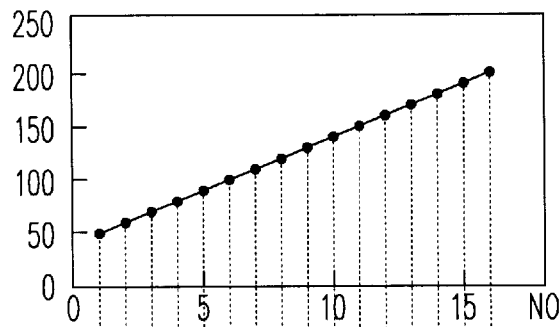
FIG. 17 is an explanatory view illustrating the operation for determining a stable area in the embodiment.
Figure 17B:
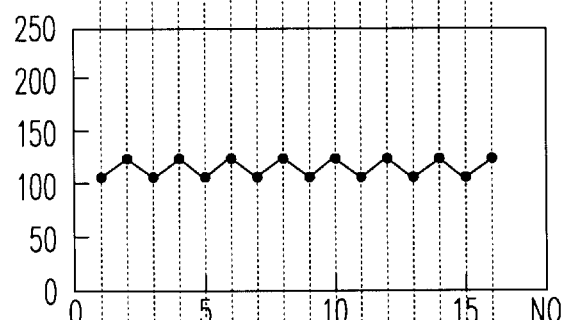
Figure 17C:

The set-up is first to prepare a reference pattern on a banner sheet while changing the DC and DR set values (S22). The method of changing the DC and DR set values is to repeatedly set the parameter DR set value for adjusting the absolute value at two points while linearly (at a constant rate) changing the parameter DC set value for contributing to the stabilization as shown in FIG. 16. In this embodiment, the number N of parameters B is only the rotating speed (N=1) of the developing roll, and in order to determine the rate of change in the solid density to the change in the rotating speed of the developing roll, the DR set value can be allocated at two points. FIGS. 17a and 17b represent the set values graphically. The density of the reference pattern (FIG. 17c) formed is measured by a sensor (S23).

Figure 17D:
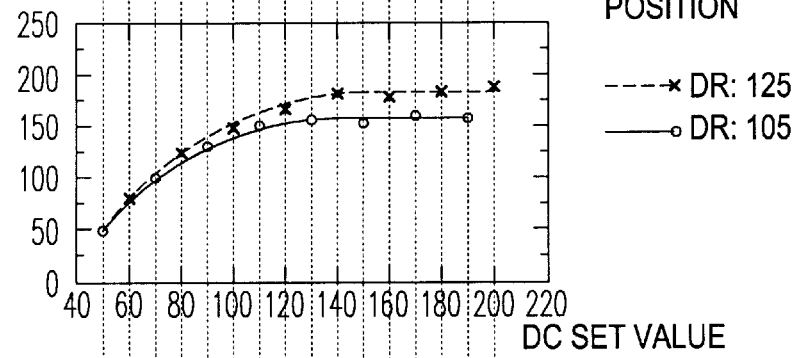
Figure 17E:
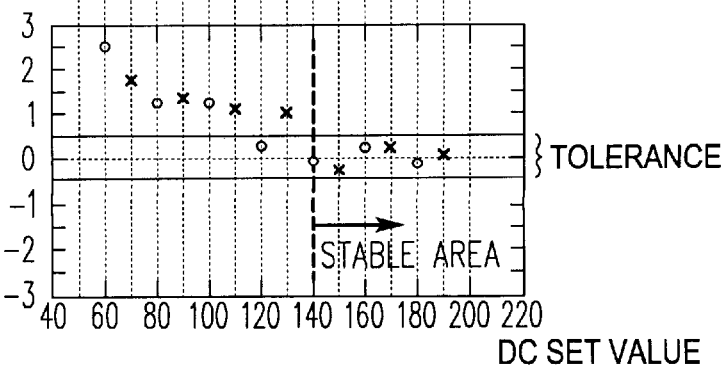

Next, the stable area is distinguished (S24). In the stable area, if the DR set value is constant, the change in the solid density is extremely small (which, in fact, can be regarded as zero) even if the DC set value may be changed. Outside the stable area, any change in the DC set value varies the solid density. Therefore, from the correspondence relationship (FIG. 17d) between DC set values for each DR set value and solid density measured values, a gradient (derivative) of the change in the solid density to the DC set value is calculated for each of the respective DR set values (FIG. 17e), and such a DC set range as to cause the value of the gradient to fall under the tolerance, is judged to be the stable area. In FIG. 17e, when the DC set value exceeds 140, the stable area enters.

Next, from the DC set value within the stable area, the optimal set value is determined (S25). The DC optimal set value is determined by adding a margin corresponding to the current temperature and humidity within the apparatus to a threshold of the stable area distinguished so that the stable area can always be secured with respect to the change in the temperature and humidity after the set-up. This margin is taken smaller the lower the temperature and humidity within the apparatus become, and is taken greater the higher the temperature and humidity become within the scope where fog does not occur. In this way, there is determined the optimal DC set value at which the stable area can be secured always with respect to any environmental fluctuation after the set-up, and any defect in image quality due to fog is prevented from occurring.

Next, the optimal value for DR set value will be determined in order to attain the target value for solid density with respect to the aforesaid DC optimal set value (S26). This can be determined by proportional distribution between the average value for solid density for each of DR set values when the DC set value is within the stable area, and the solid target density. This is formulated as follows:

$$\frac{(DT - Dm1)}{(Dm2 - Dm1)} = \frac{(DR - DR1)}{(DR2 - DR1)} \quad \text{(Numerical Formula 3)}$$

where DR: Optimal value for DR set value, DR1: DR set value 1, DR2: DR set value 2, DT: Target value for solid density, Dm1: Average value for solid density at DR1, Dm2: Average value for solid density at DR2. Solving this formula with respect to DR, $$DR = \frac{(DT - Dm1)}{(Dm2 - Dm1)}(DR2 - DR1) + DR1 \quad \text{(Numerical Formula 4)}$$

By substituting the target density, the DR set value and the average value for measured density in this formula, the optimal value for the DR set value can be calculated.

Thus, it is possible to determine DC set value and DR set value which are optimal to cause the solid density not to vary always with respect to environmental fluctuation, but to attain a desired value. These set values are used to form the main image (S28).

(5) Examples of Modifications

③ In the aforesaid embodiment, the restricted toner supply development has been exemplified and described, but this is only one instance among many, and the present invention is applicable to an image forming apparatus including parameters capable of absorbing influences by environmental fluctuation.

② In the aforesaid embodiment, examples of modifications ② to ⑤ described in the first embodiment are likewise applicable.

Third Embodiment

The description will be made of a third embodiment of an image forming apparatus of the electrophotographic type to which the present invention applies.

In this embodiment, an image forming apparatus using the general two-component development is used, and the controlled variables are shadow, highlight and ultrahighlight image density on a sheet after the fixing process. As such a parameter that has the least fluctuation in the controlled variable when mainly the parameter itself fluctuates, the AC voltage value (P-P value) of developing bias in the developer unit is used, and as the parameter B for adjusting the absolute value for image density, the amount of laser exposure and the grid voltage of the Scorotron charger are used.

Also, this embodiment shows an embodiment in which the parameter A is controlled for such setting as to minimize the output image fluctuation when the parameter A itself fluctuates, and further in which the number (aforesaid N) of parameters B is two.

(1) Construction of Image Forming Apparatus

An image forming apparatus according to this embodiment has the same construction as the first embodiment. However, while the first embodiment uses the two-component non-contact development as the development method, this embodiment uses the ordinary two-component development.

The description will be made of relationship between the AC voltage value (P-P value) of developing bias in the developer unit and the output image density using FIG. 18. FIG. 18 is a graph showing the relationship between the AC voltage value (P-P value) of developing bias in the developer unit for new developer, and shadow, highlight and ultrahighlight image density. As can be seen from FIG. 18, if the AC voltage value of the developing bias is not less than about 1.3 kV, the image density within the tolerance for the target value can be obtained even if the AC voltage value of the developing bias fluctuates.

This correspondence relationship fluctuates with the deterioration with time, and the fluctuation varies according to the use conditions of the image forming apparatus, and therefore, it is necessary to control the AC voltage value of the developing bias to the optimal value so that the output image density attains the target value from time to time.

Even in this embodiment, in order to maintain the density and the gradation of an output image at the target value respectively in the same manner as the first embodiment, three sets of reference patterns of shadow, highlight and ultrahighlight are arranged to be prepared on a recording medium to measure online after the final image forming process.

(2) Reference Pattern Preparing Mechanism and Its Monitor Mechanism

Figure 19:
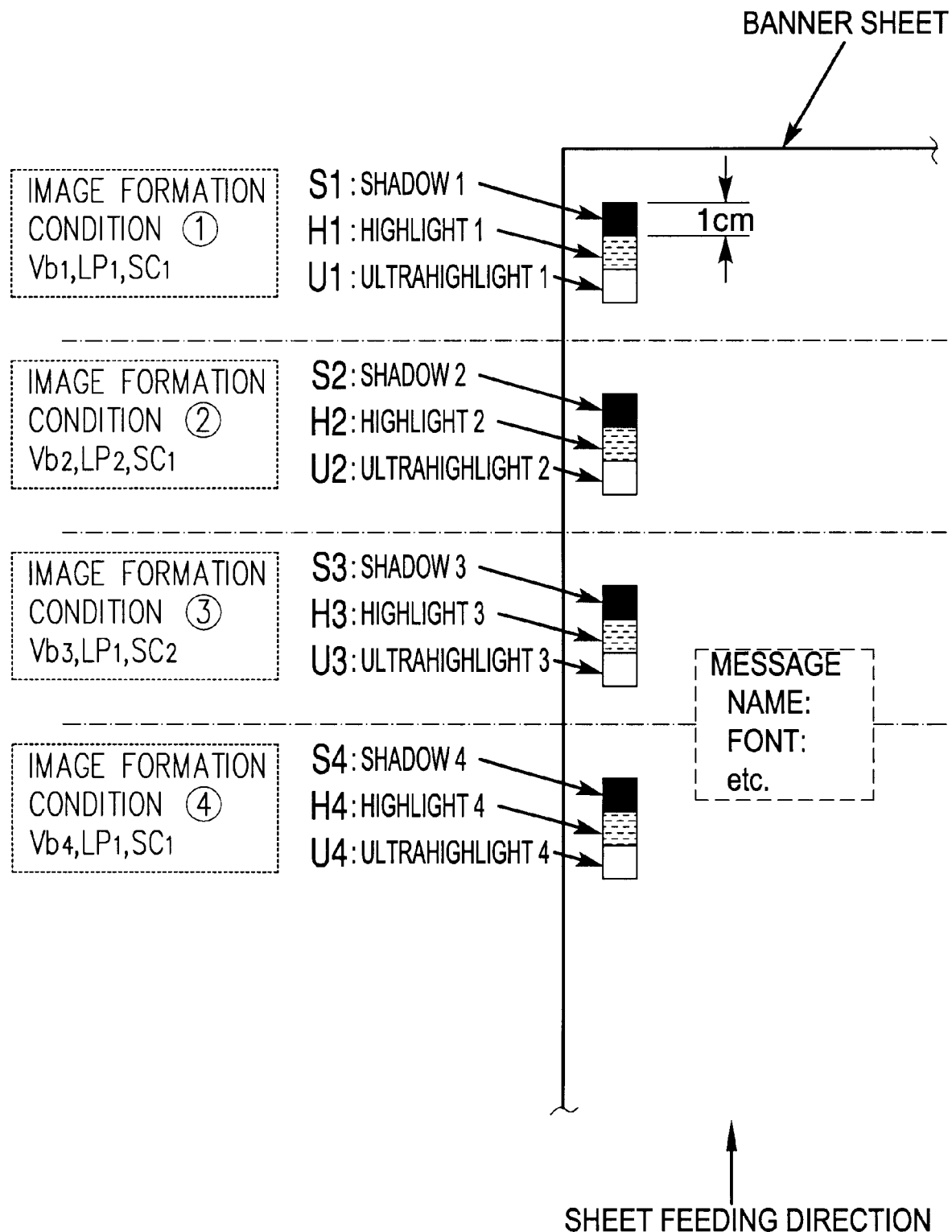
FIG. 19 is a schematic view showing a banner sheet for the embodiment.

The preparation of a reference pattern for controlling the image quality on a banner sheet and the monitor mechanism in this embodiment are basically the same as the first embodiment. However, while one type of solid density pattern is used as the reference patch in the first embodiment, this embodiment adopts three types: a shadow (=dot coverage 70%) density pattern, a highlight (=dot coverage 30%) density pattern and an ultrahighlight (=dot coverage 8%) density pattern as shown in FIG. 19.

(3) Construction of Control Unit

Figure 20:
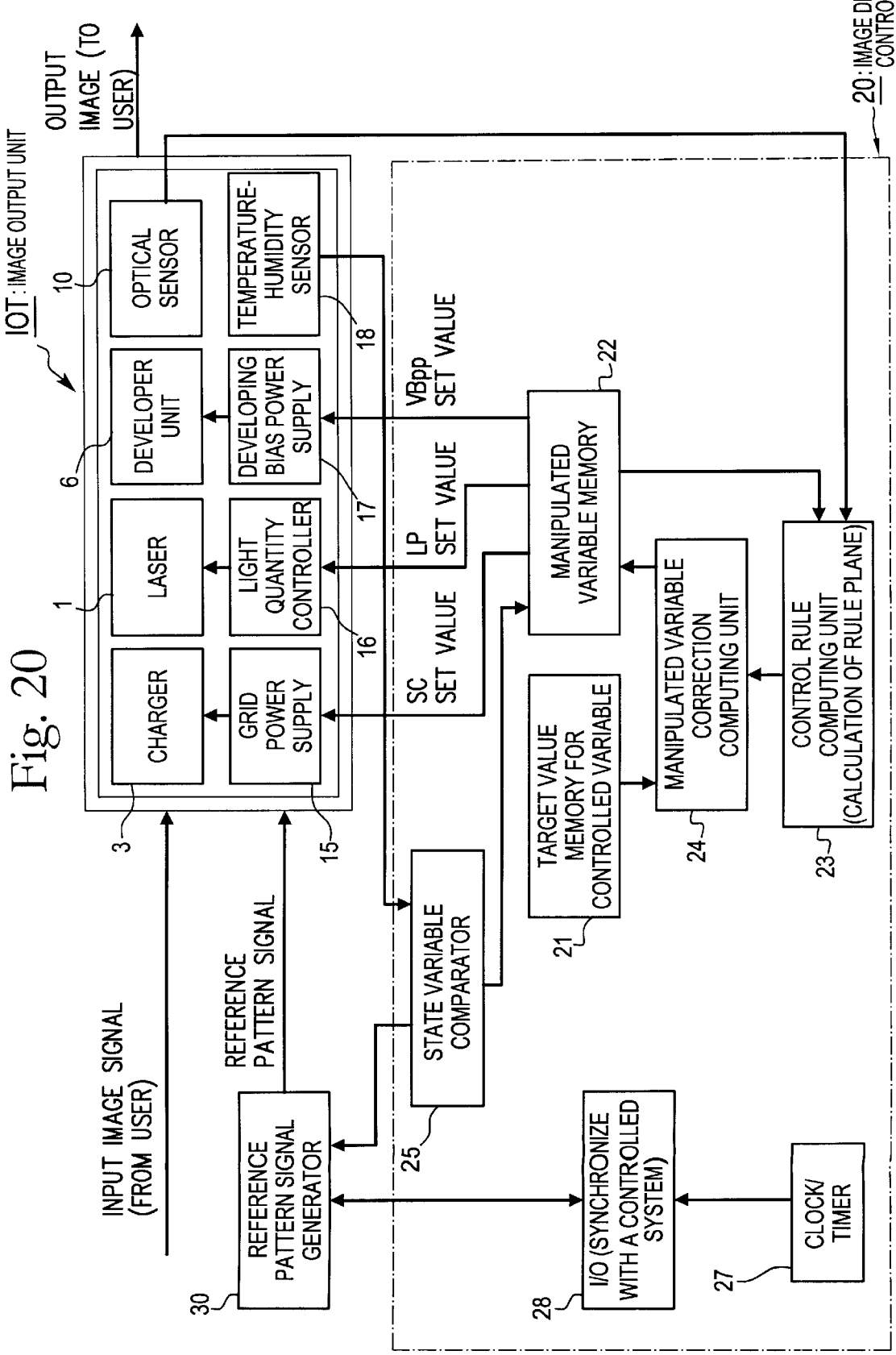
FIG. 20 is a block diagram showing the construction of an image density control unit 20 in the embodiment.

FIG. 20 is a block diagram showing the construction of a control unit 20 for controlling a Scorotron charger 3, a laser output unit 1 and a developer unit 6.

In FIG. 20, numeral 21 designates a target value memory for controlled variable, which stores output converted values from the optical sensor 10 corresponding to the target density in shadow, highlight and ultrahighlight reference patterns therein.

On the other hand, read values on the optical sensor 10, and set values for manipulated variables within a manipulated variable memory 22 are inputted into a control rule computing unit 23 to extract the control rule within this computing unit as described later.

Here, the manipulated variable is adjustment for a parameter for varying the output value of a controlled object, and in the case of this embodiment, as a manipulated variable to be controlled to such a value as to minimize the fluctuations in shadow and highlight density when the parameter itself fluctuates, there is used a peak-to-peak set value (0 to 255, hereinafter abbreviated to VBpp set value) for AC voltage for developing bias of the developer unit. As the manipulated variable for adjusting (shadow, highlight density) the absolute value, there are used a grid voltage set value (0 to 255, hereinafter abbreviated to SC set value) of the Scorotron charger 3 and a laser power set value (0 to 255, hereinafter abbreviated to LP set value). In this respect, the VBpp set value is used jointly to adjust the absolute value of the ultrahighlight density.

Also, the SC set value, the LP set value and the VBpp set value during preparation of a banner sheet and during ordinary image output are stored in the manipulated variable memory 22 respectively in such a manner that a value corresponding to an output signal from the manipulated variable correction computing unit 24 can be read out appropriately. The SC set value read out from the manipulated variable memory 22 is supplied to grid power supply 15, whereby the grid power supply 15 applies the voltage corresponding to the SC set value to the Scorotron charger 3. Also, the LP set value read out from the manipulated variable memory 22 is supplied to a light quantity controller 16, whereby the light quantity controller 16 furnishes laser power corresponding to the LP set value to the laser output unit 1. Also, the VBpp set value read out from the manipulated variable memory 22 is supplied to the developing bias power supply 17, whereby the developing bias power supply 17 applies P-P voltage of AC voltage corresponding to the VBpp set value to the developer unit 6.

A reference pattern signal generator 30 is a circuit for directing the preparation of shadow, highlight and ultrahighlight density patches on a banner sheet, and outputs a calibration reference pattern signal to the image output unit IOT at reference pattern preparing timing when a banner sheet is outputted. Thus, the reference pattern shown in FIG. 19 is prepared.

The operation timing of the reference pattern signal generator 30 is controlled by an I/O adjustment unit 28. The I/O adjustment unit 28 monitors a time signal outputted by a clock timer 27 when a banner sheet is outputted, and supplies an operation timing signal to the reference pattern signal generator 30 so as to form shadow, highlight and ultrahighlight density patches at predetermined positions.

(4) Operation of the Image Forming Apparatus

Figure 21:
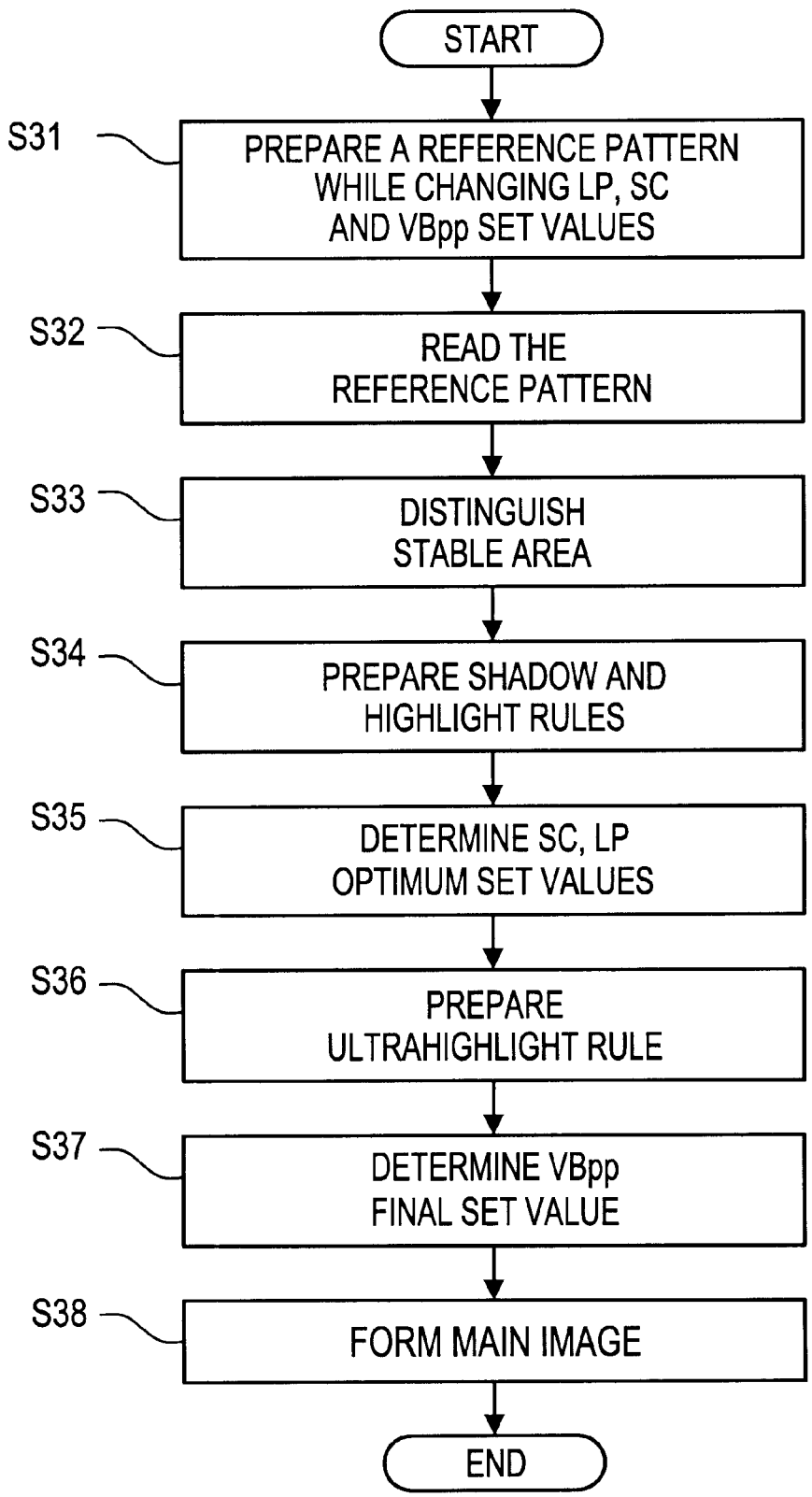
FIG. 21 is a flow chart showing the operation in the embodiment.

Next, the description will be made of the operation of this image forming apparatus based on the aforesaid construction mainly using FIG. 21.

First, a reference pattern will be prepared on a banner sheet while changing the LP, SC and VBpp set values (S12). A method of changing the LP, SC and VBpp set values is to repeatedly set, as three sets of combination patterns, LP and SC set values, which are parameters for adjusting the absolute value, while linearly (at a constant rate) changing the VBpp set value as shown in FIG. 22. The density of the reference patterns thus prepared while changing each parameter set value is measured by a sensor (S13).

Figure 23:
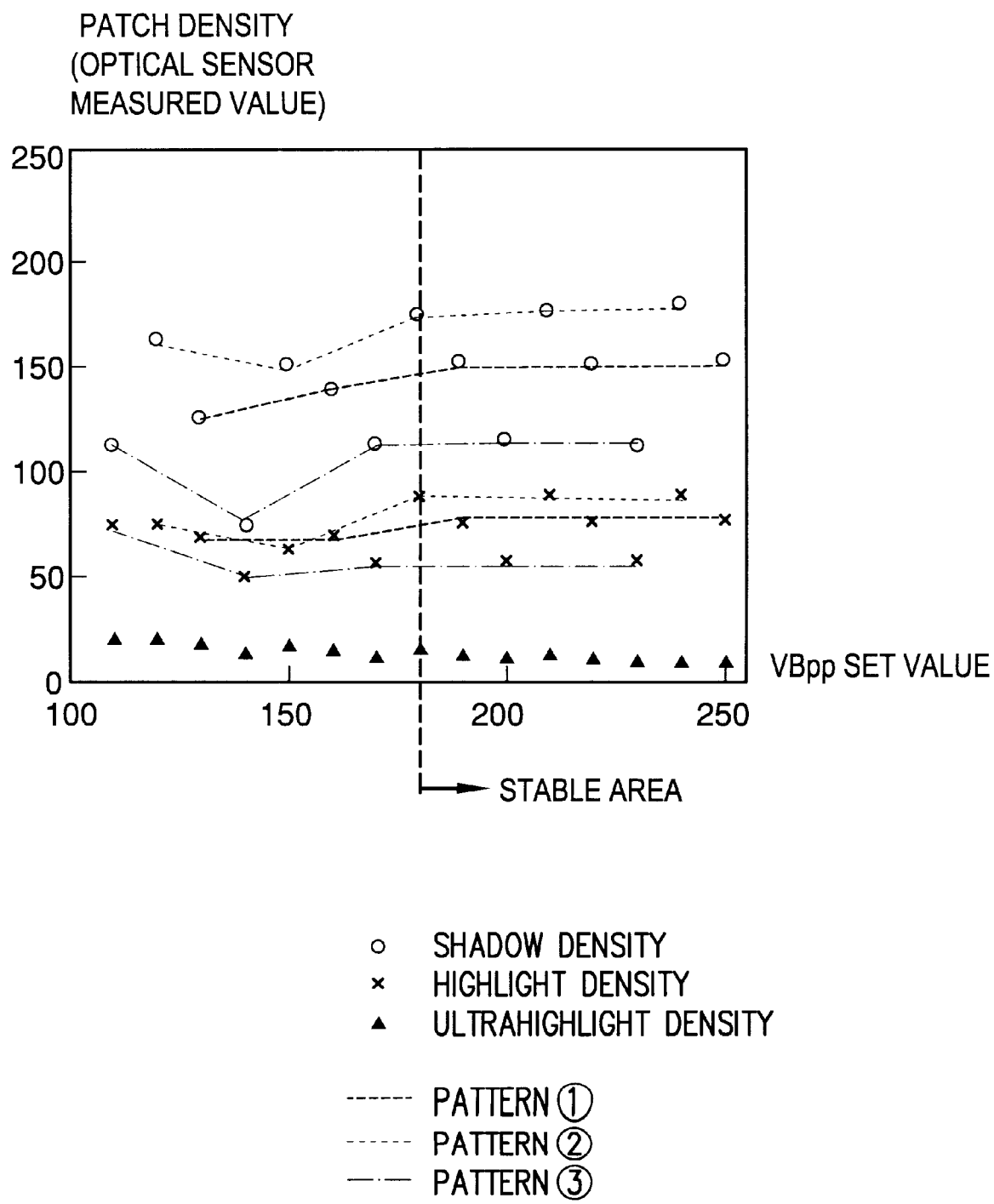
FIG. 23 is a graph for patch measured value for VBpp set value in the embodiment.

Next, the stable area is distinguished (S14). In the stable area as previously described, if the LP and SC set values are constant, the changes in the shadow density and the highlight density are extremely small (which, in fact, can be regarded as zero) even if the VBpp set value may be changed. Therefore, as in the first embodiment, the rate of change of density (derivative) to the VBpp set value is calculated for each of the combination patterns of the LP and SC set values to determine such a VBpp set range as to cause the rate of change of density to be not more than the specified value, and, of three sets of combination patterns of LP/SC set values, the widest range is judged to be the stable area for VBpp. FIG. 23 shows the measured result of the patch density to the VBpp set value for each of the combination patterns of the LP and SC set values. In FIG. 23, when the VBpp set value exceeds 180, the stable area enters.

Next, a control rule for controlling the shadow and highlight density is prepared (S15). The control rule is extracted as such a control rule plane as shown in FIG. 24 from the combinations of the LP/SC set values within the aforesaid stable area and the shadow and highlight density.

Figure 24:
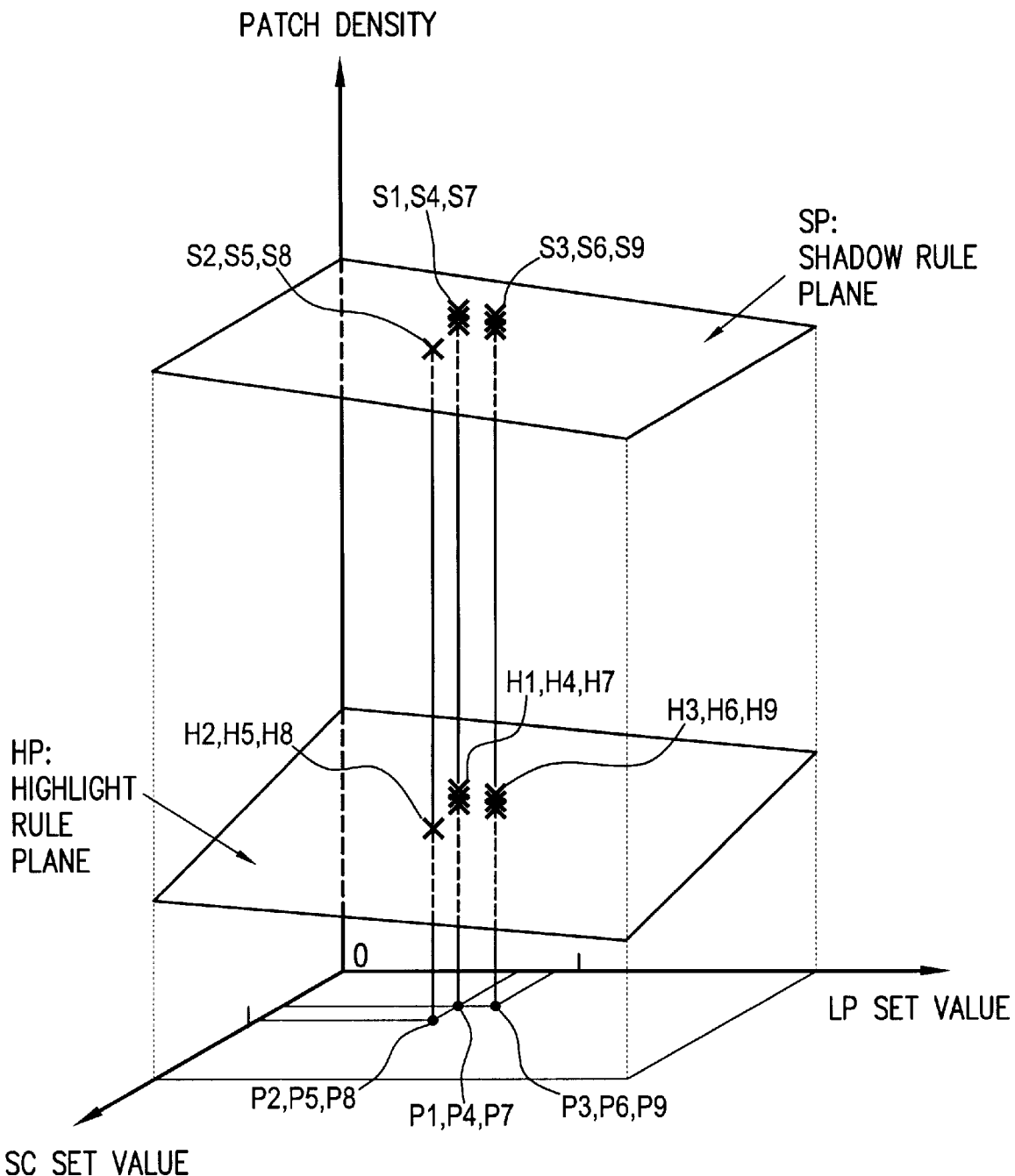
FIG. 24 is an explanatory view for illustrating the operation for learning the shadow and highlight control rule in the embodiment.

In FIG. 24, numerals P1 to P9 designate points showing three sets of combinations of LP set values and SC set values. Here, the points indicating the shadow density corresponding to points P1 to P9 are represented by S1 to S9, and similarly, the points indicating the highlight density corresponding to points P1 to P9 are represented by H1 to H9. A plane obtained by effecting least square error approximation from points Si to S9 is represented by a shadow rule plane SP, and a plane obtained by effecting least square error approximation from points H1 to H9 is represented by a highlight rule plane HP. Here, the points indicating the shadow density obtained when the LP set values and the SC set values are appropriately varied are all to be placed within the shadow rule plane SP. Also, the points indicating the highlight density obtained when the LP set values and the SC set values are appropriately varied likewise are all to be placed within the highlight rule plane HP.

A reason why three sets of combinations of LP set values and SC set values are used during the preparation of the patch is as follows:

First, generally assuming the number of manipulated variables to be N, a plane indicating the control rule becomes a N-dimensional plane within a N+1-dimensional space. Accordingly, in order to unconditionally determine this N-dimensional plane, N+1 pieces of data points are required, and it is further necessary that with respect to matrix (N+1, N) consisting of combinations of each set value, matrix (N+1, N+1) obtained by combining column vectors of term (N+1) consisting of all equal components becomes regular. Thereby, the optimal values for N pieces of manipulated variables can be obtained at the same time and collectively by patch preparation/detection at a time. In other words, if the changes in the output images when each of N pieces of manipulated variables is changed, that is, the control rule for each manipulated variable is grasped as each coefficient for (N+1) pieces of linear simultaneous equations with N unknowns, the solutions for N pieces of manipulated variables can be analytically determined.

In the case of this embodiment, since two manipulated variables: LP set value and SC set value are set, N=2 is given, and three sets of control examples are required. As shown in FIG. 26, the matrix of (N+1, N+1)=(3,3) must be regular. If (SC, LP) is (76, 98), (76, 108) and (96, 98) as shown in, for example, FIG. 27, the determinant becomes −200, and becomes regular.

When the control rule thus obtained is used, the LP set value and SC set value for attaining predetermined target density can be unconditionally determined. In other words, the target density of the shadow density pattern and the highlight density pattern is set as a target density plane within the aforesaid control rule space. The manipulated variable correction computing unit describes a plane (plane parallel to the LP set value axis-SC set value axis plane) for the target density value within the control rule space to lay it on top of the shadow rule plane SP and the highlight rule plane HP which are read out from the control rule computing unit.

Figure 25:
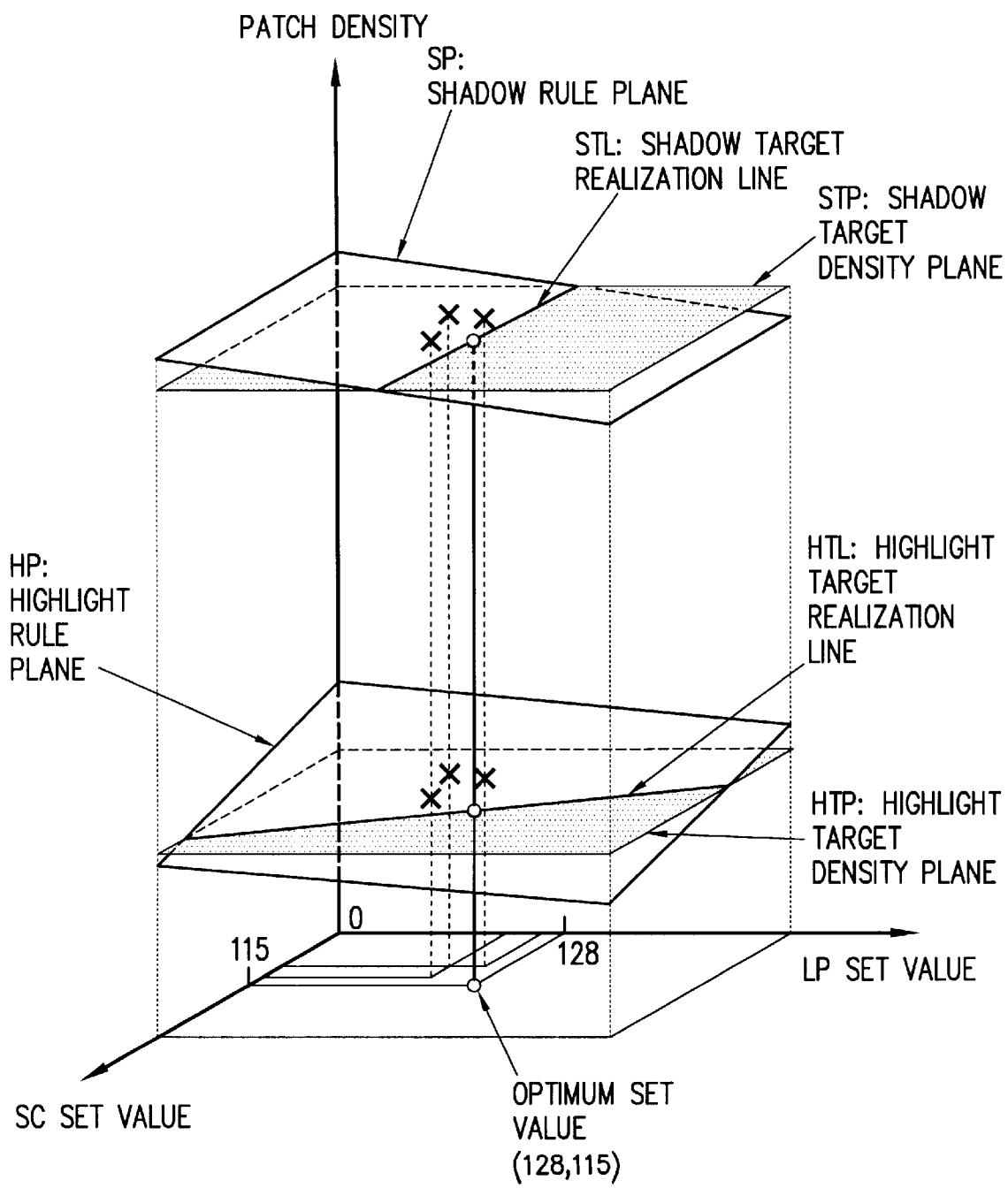
FIG. 25 is an explanatory view for illustrating the operation of determining the optimal values for LP and SC set values in the embodiment.

By the aforesaid process, as shown in FIG. 25, the shadow rule plane SP on the shadow density, the highlight rule plane HP on the highlight density, the shadow target density plane STP and the highlight target density plane HTP are constituted within the control rule space, and the aforesaid content of control during the set-up is to be plotted there.

The control rule on the shadow density and the control rule on the highlight density are represented with numeral formulas respectively as follows;

(Numerical Formula 5)

$D70 = a1 \cdot SC + a2 \cdot LP + a3$ $D30 = b1 \cdot SC + b2 \cdot LP + b3$ where D70 is shadow density, D30 is highlight density, SC is a SC set value, and LP is a LP set value.

Also, a1, a2, a3, b1, b2 and b3 are coefficients. When this formula is solved with respect to the SC set value SC, and LP set value LP, (Numerical Formula 6)

We get, $SC = (b2 \cdot D70 - a2 \cdot D30 - a3 \cdot b2 + a2 \cdot b3)/(a1 \cdot b2 - a2 \cdot b1)$ $LP = (b1 \cdot D70 - a1 \cdot D30 - a3 \cdot b1 + a1 \cdot b3)/(a2 \cdot b1 - a1 \cdot b2)$ If the shadow target density and the highlight target density are substituted into D70 and D30 in this formula, the SC and LP optimal set values can be determined (S16). The control rule can be represented by coefficients a1, a2, a3, b1, b2 and b3.

In the case of the example used in FIG. 25, if the LP and SC set values are set to (128, 115) from the aforesaid calculation, the respective target density for the shadow and highlight can be attained at the same time. In this way, the optimal SC set value and LP set value for realizing the shadow and highlight density to desired values can be determined from the setup data.

Next, the control rule for controlling the ultrahighlight density will be prepared (S17). The ultrahighlight density control rule can be basically prepared by the same method as the preparation of the control rule for controlling the shadow and highlight density. As regards the ultrahighlight density, however, the VBpp is added to the parameters for preparing the rule because the density varies even if the VBpp is within the stable area. Further, in the case of the ultrahighlight, since there may be some cases where the density is washed out depending on the set value and does not appear, for the controlled variable used for preparing the rule, only data in which the density exceeding the specified value has been detected are used. Under such conditions, the least square error approximation is effected from the four lowest points showing the ultrahighlight density (detection density of ultrahighlight density pattern) to extract the control rule plane of ultrahighlight density.

It can be expressed using a numerical formula as follows: The control rule on the ultrahighlight density is, (Numerical Formula 7)

$D08 = c1 \cdot SC + c2 \cdot LP + c3 \cdot Vb + c4$ where D08 is ultrahighlight density, SC is a SC set value, LP is a LP set value, and Vb is a VBpp set value. Also, c1 to c4 are coefficients. The control rule can be represented by coefficients c1 to c4.

Next, the optimal value for the VBpp set value which attains the target value for the ultrahighlight density will be determined (S18). The optimal value for the VBpp set value can be determined by substituting the target value for the ultrahighlight density, and the LP and SC set values for attaining the shadow and highlight target density in the control rule on the ultrahighlight density respectively to solve with respect to Vb.

Thus, it is possible to determine the LP set value, SC set value and VBpp set value which are optimal for realizing the shadow, highlight and ultrahighlight density at a desired value respectively by the set-up. These set values will be used to actually perform the image formation (S20).

Thus, a series of control operations are completed. Thereafter, in the same manner as described above, when the AC voltage itself of developing bias fluctuates, the VBpp set value is set to such a value as to minimize the fluctuation in the shadow and highlight density of the output image, and the LP set value and SC set value which are optimal for realizing the target density are set to control the accurate image quality (density and gradation)

(5) Examples of Modifications

In the aforesaid embodiment, such various modifications as described below are possible.

① In this embodiment, the black or single color image forming apparatus has been exemplified and described, but the present invention is not restricted thereto, but is capable of exhibiting the quite same effect for, for example, a color image forming apparatus of a type in which an image is formed by repeating the development of yellow, magenta, and cyan, or black, yellow, magenta and cyan in turn on a photosensitive member, or an analog copying machine.

② In the embodiment, as the density of the reference pattern, there have been employed three types: a shadow (dot coverage 70%) density pattern, a highlight (dot coverage 30%) density pattern, and a ultrahighlight (dot coverage 8%) density pattern. This is only one instance among many, and the present invention is not restricted to these three types, but for example, two types: a density pattern corresponding to dot coverage of 50% and a ultrahighlight (dot coverage 8%) density pattern may be controlled, and furthermore gradation points may be controlled by using many types of patterns. If, however, it is desired to independently control each gradation point, it is necessary to prepare manipulated variables of types of a number corresponding to the number of gradation points, or it may be possible to detect the density of the (white) background portion to control fog.

③ In this embodiment, the fixed image density of a single color reference pattern was employed as the controlled variable, but the final image quality after the transfer-fixing process is not restricted thereto. As the final image quality, for example, the line width, line density and resolution pattern may be used as controlled variables. In this case, for measuring means for measuring the control variable online, those corresponding to the respective control variables are used.

④ In this embodiment, as a parameter for controlling to such a value as to minimize the output image fluctuation when the parameter itself fluctuates as a manipulated variable, the AC voltage value (P-P value) for developing bias of the developer unit is adopted, and the amount of laser exposure and the grid voltage of the Scorotron charger are used as a parameter for mainly adjusting the absolute value. This is only one instance among many, and any parameter may be used so long as it is capable of changing the output image density. The same effect as in this embodiment can be obtained even if, for example, as a parameter for adjusting an absolute value, the rotating speed of the developing roll or the DC voltage of developing bias is combined for use.

⑤ The optical sensor used in this embodiment is only one instance among many, and in order to obtain the effect of the present invention, any sensor can be used so long as the image quality of a reference pattern can be accurately measured, and any type of sensors such as CCD sensor can also be used.

⑥ In this embodiment, a banner sheet was used for the preparation of a reference pattern, but when a sheet exclusively used for a reference pattern is available, or for the user who does not use any banner sheet, the exclusive sheet may be used to prepare the reference pattern. Especially if the temperature and humidity are monitored in advance and when the temperature and humidity greatly change, the exclusive sheet is used to prepare/detect the reference pattern, the effect will be great.

The present invention has the effect that on feedback controlling an image forming apparatus, a final image having the highest degree of detection accuracy can be used as a detection object.

Also, according to the present invention, since the feedback control can be performed only by the detection of the final image, there is no need for using jointly with another control system, and this leads to the effect that the cost can be greatly reduced.

Also, according to the present invention, there is the effect that there is no need for calibration which had to be separately made conventionally.

Also, according to the present invention, since even if the physical quantity on an image forming apparatus fluctuates, setting which is difficult to affect the output image can be performed, the effect of one correction control will be effective for a long period of time, and it is possible to control the image quality with a high degree of accuracy even if the reference pattern is not frequently outputted.

Also, according to the present invention, there is the effect that it is possible to collectively detect, from the same reference pattern, the respective behavior concerning a parameter for mainly affecting the stability of an output image and a plurality of parameters for adjusting the absolute value of the image quality.

Therefore, there is further the effect that for a sheet on which a reference pattern is- recorded, only a sheet thereof is sufficient, and by using this sheet also as a message sheet, no exclusive sheet for control is required while the reference pattern on the final image is used.

Also according to the present invention, there is the effect that since the set value for manipulated variable can be determined so as to enhance the stability of the output image quality, it is possible to always provide constant image quality without performing frequent feedback control.

Also, according to the present invention, there is the effect that because of the combination of the aforesaid effects, the user does not suffer disadvantage (lowered productivity due to consumption of sheets and image forming time lost, and the like) caused by preparing/detecting the reference pattern, but can enjoy only advantage of improved control accuracy.

What is claimed is:

1. An image forming apparatus of the electrophotographic type for performing feedback control with a plurality of electrophotographic parameters as manipulated variables so that a controlled variable for image quality becomes a target value, and for making said controlled variable stable with respect to predetermined environmental fluctuation in a predetermined stable area of a predetermined first electrophotographic parameter, and further for varying said controlled variable in said stable area of said first electrophotographic parameter by a predetermined second electrophotographic parameter, said image forming apparatus comprising:

means for setting said target value for said controlled variable;

means for making a set value for said manipulated variable, variable;

means for preparing a reference pattern while varying said first electrophotographic parameter over a range including said stable area, and varying said second electrophotographic parameter to set said controlled variable in said stable area to said target value;

reference pattern measuring means for measuring said controlled variable for said reference pattern; and means for determining a value for said first electrophotographic parameter in the stable area on the basis of measured results by said reference pattern measuring means, and for further determining the value for said second parameter which causes said controlled variable in the value thus determined to correspond with said target value.

2. An image forming apparatus as defined in claim 1, wherein on preparing said reference pattern, combinations of each set value for N (positive integer) types of second electrophotographic parameters have at least (N+1) patterns, and with respect to a matrix (N+1, N) consisting of combinations of each set value, the matrix (N+1, N+1) obtained by combining column vectors of term (N+1) consisting of all equal components includes regular combinations.

3. An image forming apparatus as defined in claim 1, wherein for a recording medium on which said reference pattern is written, there is used only a sheet, which is outputted discretely from ordinary image output to convey information to the user.

4. An image forming apparatus as defined in claim 1, wherein said image forming apparatus main body is a color image forming apparatus, said reference pattern is arranged in a line at different positions on a message sheet for each color, and said reference pattern measuring means is prepared for each color and is installed so as to coincide with the arrangement positions for each color on said reference pattern.

5. An image forming apparatus as defined in claim 1, wherein in said stable area for said first electrophotographic parameter, a plurality of physical fluctuations, which occur within said image forming apparatus main body, operate so that they are offset with each other with respect to variations in said controlled variable.

6. An image forming apparatus as defined in claim 5, wherein for the development process, the two-component non-contact development is employed.

7. An image forming apparatus as defined in claim 1, wherein in said stable area for said first electrophotographic parameter, a fluctuation absorbing function having a mechanism constructed so as to absorb physical fluctuations which occur within said image forming apparatus main body is maximized or optimized.

8. An image forming apparatus as defined in claim 7, wherein for the development process, there is used a development method using a saturated area based on restricted toner supply.

9. An image forming apparatus as defined in claim 1, wherein said parameter is set in such a manner that the fluctuation of said controlled variable when said parameter itself further fluctuates with respect to another electrophotographic parameter, is minimized.

10. An image forming method of the electrophotographic type for performing feedback control with a plurality of electrophotographic parameters as manipulated variables so that a controlled variable for image quality becomes a target value, and for making said controlled variable stable with respect to predetermined environmental fluctuation in a predetermined stable area for a predetermined first electrophotographic parameter, and further for varying said controlled variable in said stable area for said first electrophotographic parameter by a predetermined second electrophotographic parameter, said image forming methods comprising the steps of:

setting a target value for said controlled variable;

preparing a reference pattern while varying said first electrophotographic parameter over a range including said stable area, and varying said second electrophotographic parameter to set said controlled variable in said stable area to said target value;

measuring said controlled variable for said reference pattern; and determining a value for said first electrophotographic parameter in said stable area on the basis of measured results for said reference pattern, and further determining the value for said second parameter which causes said controlled variable in the value thus determined to correspond with said target value.

11. An image forming apparatus of the electrophotographic type for performing feedback control with a plurality of electrophotographic parameters as manipulated variables so that a controlled variable for image quality becomes a target value, said image forming apparatus comprising:

a photosensitive member showing irradiation and exposure energy/surface potential characteristics having an area in which the surface potential with respect to the irradiation and exposure energy lowers slightly; and a developer unit having a development roller for supplying toner, which is developer, to said photosensitive member, a development roller motor for rotating this development roller, and a motor controller for controlling the rotating speed of this roller motor, wherein said developer unit is of a type in which toner supply to said photosensitive member is restricted;

means for setting a target value for said controlled variable;

means for making a set value for said manipulated variable, variable;

means for determining, of said plurality of electrophotographic parameters, a first electrophotographic parameter having a stable area with respect to said controlled variable;

means for determining a second electrophotographic parameter for varying said controlled variable with said first electrophotographic parameter as a value of said stable area; and means for determining said second electrophotographic parameter in said stable area for said first electrophotographic parameter, wherein said first electrophotographic parameter is development voltage of said developer unit, and said second electrophotographic parameter is a rotating speed of said development roller.

* * * * *